United States Patent
Karageozian et al.

(10) Patent No.: US 12,454,549 B2
(45) Date of Patent: Oct. 28, 2025

(54) TREATMENTS FOR DISEASES AND DISORDERS THAT INVOLVE OXIDATIVE STRESS

(71) Applicant: Jenius Pharma, LLC, Henderson, NV (US)

(72) Inventors: Hampar L Karageozian, San Juan Capistrano, CA (US); Vicken H Karageozian, San Juan Capistrano, CA (US); John Y Park, Santa Ana, CA (US)

(73) Assignee: Jenius Pharma, LLC, Henderson, NV (US)

( * ) Notice: Subject to any disclaimer, the term of this patent is extended or adjusted under 35 U.S.C. 154(b) by 27 days.

(21) Appl. No.: 18/206,415

(22) Filed: Jun. 6, 2023

(65) Prior Publication Data
US 2024/0132542 A1   Apr. 25, 2024

Related U.S. Application Data

(60) Continuation-in-part of application No. 16/882,656, filed on May 25, 2020, now abandoned, which is a division of application No. 16/012,706, filed on Jun. 19, 2018, now abandoned.

(60) Provisional application No. 63/350,373, filed on Jun. 8, 2022, provisional application No. 62/521,984, filed on Jun. 19, 2017.

(51) Int. Cl.
| | |
|---|---|
| C07K 5/09 | (2006.01) |
| A61K 9/00 | (2006.01) |
| A61K 9/08 | (2006.01) |
| A61K 31/185 | (2006.01) |
| A61K 38/05 | (2006.01) |
| A61K 38/06 | (2006.01) |
| A61K 38/07 | (2006.01) |
| A61K 38/08 | (2019.01) |
| A61K 38/12 | (2006.01) |
| A61K 47/20 | (2006.01) |
| C07K 5/062 | (2006.01) |
| C07K 5/083 | (2006.01) |
| C07K 5/093 | (2006.01) |
| C07K 5/097 | (2006.01) |
| C07K 5/103 | (2006.01) |
| C07K 5/12 | (2006.01) |
| C07K 7/06 | (2006.01) |
| C07K 7/64 | (2006.01) |

(52) U.S. Cl.
CPC ........ *C07K 5/06026* (2013.01); *A61K 9/0048* (2013.01); *A61K 31/185* (2013.01); *A61K 38/05* (2013.01); *A61K 38/06* (2013.01); *A61K 38/07* (2013.01); *A61K 38/08* (2013.01); *A61K 38/12* (2013.01); *A61K 47/20* (2013.01); *C07K 5/0806* (2013.01); *C07K 5/081* (2013.01); *C07K 5/0815* (2013.01); *C07K 5/0817* (2013.01); *C07K 5/0819* (2013.01); *C07K 5/0821* (2013.01); *C07K 5/1008* (2013.01); *C07K 5/12* (2013.01); *C07K 7/06* (2013.01); *C07K 7/64* (2013.01)

(58) Field of Classification Search
CPC .. C07K 5/06026; C07K 5/0806; C07K 5/081; C07K 5/0815; C07K 5/0817; C07K 5/0819; C07K 5/0821; C07K 5/1008; C07K 5/12; C07K 7/06; C07K 7/64
See application file for complete search history.

(56) References Cited

U.S. PATENT DOCUMENTS

| | | | |
|---|---|---|---|
| 6,022,854 | A | 2/2000 | Shuman |
| 9,018,352 | B2 | 4/2015 | Mackel et al. |
| 9,872,886 | B2 | 1/2018 | Mackel et al. |
| 9,896,480 | B2 | 2/2018 | Mackel et al. |
| 10,307,460 | B2 | 6/2019 | Mackel et al. |
| 10,590,166 | B2 | 3/2020 | Mackel et al. |
| 10,639,347 | B2 | 5/2020 | Mackel et al. |
| 10,925,889 | B2 | 2/2021 | Peyman |
| 2006/0270005 | A1 | 11/2006 | Marliere et al. |
| 2010/0311052 | A1 | 12/2010 | Bendtzen et al. |
| 2011/0182989 | A1 | 7/2011 | Mackel et al. |
| 2013/0129621 | A1 | 5/2013 | Mackel et al. |
| 2016/0022763 | A1 | 1/2016 | Mackel et al. |
| 2016/0058881 | A1 | 3/2016 | DiMarchi et al. |
| 2018/0207227 | A1 | 7/2018 | Karageozian et al. |
| 2020/0345805 | A1 | 11/2020 | Karageozian et al. |
| 2020/0354402 | A1 | 11/2020 | Park et al. |
| 2020/0392181 | A1 | 12/2020 | Park et al. |
| 2021/0002328 | A1 | 1/2021 | Mackel et al. |
| 2021/0085749 | A1 | 3/2021 | Karageozian et al. |

(Continued)

FOREIGN PATENT DOCUMENTS

| | | |
|---|---|---|
| CN | 1849132 A | 10/2006 |
| JP | H10-146195 A | 6/1998 |
| JP | 2003-313119 A | 11/2003 |

(Continued)

OTHER PUBLICATIONS

Lijie Men, et al., Further studies on the fragmentation of protonated ions of peptides containing aspartic acid, glutamic acid, cysteine sulfinic acid, and cysteine sulfonic acid; Rapid Communications in Mass Spectromotry, vol. 19, No. 1, pp. 23-30 (Nov. 2004).

(Continued)

*Primary Examiner* — Lianko G Garyu
*Assistant Examiner* — Kristina M Hellman
(74) *Attorney, Agent, or Firm* — Robert D. Buyan; Stout, Uxa & Buyan, LLP

(57) ABSTRACT

Peptide compounds and their use in treating diseases and disorders that cause, are caused by, or are characterized by cellular oxidative stress.

5 Claims, 20 Drawing Sheets
Specification includes a Sequence Listing.

(56) References Cited

U.S. PATENT DOCUMENTS

| | | |
|---|---|---|
| 2021/0275624 A1 | 9/2021 | Karageozian et al. |
| 2022/0031800 A1 | 2/2022 | Karageozian et al. |

FOREIGN PATENT DOCUMENTS

| | | |
|---|---|---|
| WO | WO94/15953 A1 | 7/1994 |
| WO | WO94/20531 A1 | 9/1994 |
| WO | WO98/33494 A1 | 8/1998 |
| WO | WO01/81581 A2 | 11/2001 |
| WO | WO2008/152508 A2 | 12/2008 |
| WO | WO2011/005540 A1 | 1/2011 |
| WO | WO2011/060104 A2 | 5/2011 |
| WO | WO2012/045719 A2 | 4/2012 |
| WO | WO2012/154894 A2 | 11/2012 |
| WO | WO2016/177898 A9 | 12/2016 |
| WO | WO2019/036382 A1 | 2/2019 |
| WO | WO2021/021668 A1 | 2/2021 |

OTHER PUBLICATIONS

Mitchell et al., "Polyarginine enters cells more efficiently than other polycationic homopolymers," J. Peptide Res. 56:318-325 (2000) (Year: 2000).
Morjen et al., "PIVL, a snake venom Kunitz-type serine proteaseinhibitor, inhibits invitro and in vivo angiogenesis," Microvasc. Res. 95:149-156 (2014) (Year: 2014).
Mc Bean, "Sulfur-Containing Amino Acids", Handbook of neurochemistry and molecular biology 3rd ed., pp. 134-154 (2007) (Year: 2007).
Cysteic Acid, Cas Reg# 498-40-8, accessed Feb. 21, 2022, at URL commonchemistry.cas.org/detail?cas_rn=498-40-8 (2023). (Year: 2023).
Cysteine, Cas Reg# 52-90-4, accessed Feb. 21, 2022, at URL commonchemistry.cas.org/detail?cas_rn=52-90-4 (2023). (Year: 2023).
UniProtKB A0A2G9RE29 (accessed Feb. 22, 2023 at URL uniprot.org/uniprotkb/A0A2G9RE29.txt (Year: 2023).
UniProtKB A0A0R3WUS0 (accessed Feb. 22, 2023 at URL uniprot.org/uniprotkb/A0A0R3WUS0.txt) (Year: 2023).
Lee, T.T. et al. "Light-triggered in vivo Activation of Adhesive Peptides Regulates Cell Adhesion, Inflammation and Vascularization of Biomaterials". Nature Materials. Mar. 2015, Epub Dec. 15, 2014, vol. 14, No. 3; pp. 352-360; p. 2, 2nd paragraph; p. 4, 3rd paragraph; DOI: 10.1038/nmat4157.
Cleveland Clinic, Cytokine Release Syndrome (CRS), What It Is & Treatment https://, https://my.clevelandclinic.org/health/diseases/22700-cytokine-release-syndrome (Year: 2022).
Suh, et al., "An Angiogenic, Endothelial-Cell-Targeted Polymeric Gene Carrier". Molecular Therapy. Nov. 2002, vol. 6, No. 5; pp. 664-672.
Kristensen, T et al. "Primary Structure of Human a2-Macroglobulin". The Journal of Biological Chemistry. Jul. 10, 1984, vol. 259, No. 13; pp. 8313-8317; p. 8315, 1st column, 4th paragraph.
Luke, Matthias et al., "Effects of the protein tyrosine kinase inhibitor genestein and taurine on retinal function in isolated superfused retina", Graefe's Archive for Clinical and Experimental Ophthalmology, vol. 245, No. 2, Feb. 2, 2006, pp. 222-248.
Rodak Roksana et al., "Induction of reactive oxygen intermediates-dependent programmed cell death in human malignant ex vivo glioma cells and inhibition of the vascular endothelial growth factor production by taurolidine", Journal of Neurosurgery, American Association of Neurological Surgeons, US, vol. 102, No. 6, Jun. 2005, pp. 1055-1068.
Tsaprailis, G. et al., "Refining the model for selective cleavage at acidic residues in arginine-containing protonated peptides", International Journal of Mass Spectrometry, vol. 195-196, Jan. 2000, pp. 467-479.
Liu, Yayuan, et al., "Integrin [alpha]v.[beta]3targeting activity study of different retro-inverso sequences of RGD and their potentiality in the designing of tumor targeting peptides", Amino Acids, vol. 47, No. 12, Jul. 2015, pp. 2533-2539.

Nishikawa N. et al, "Synthesis and Biological Properties of Partially Modified Retro and Retro-inverso Pseudo Peptides of Arg-Gly-Asp (RGD)", Biorganic & Medicinal Chemistry Letters, vol. 6, No. 22, Nov. 1996, pp. 2725-2728.
Wang, Xiaonan et al., "Oxime chemistry-mediated covalent capturing on electrode surface with guanidinium recognition and application for aldolase activity assay," Sensors and Actuators B: Chemical, vol. 242, Nov. 2016, pp. 687-693.
Lavrinienko et al. "MAG: Ilypotlleticai protein HDR62_04865, part;al [bactenum])" Sep. 29, 2020; Retrieved from the internet on Oct. 25, 2023. <URL: https:/www.ncbi.nlm.nih.gov/protein/MBD5397450.1.
Craig et al. "hypothetical protein HYH02_005451 [Chlamydornonas sch!oesseri)" 2021: Retrieved from the internet on Oct. 25, 2023: <URL:https://www.ncbi.nlm.nih.gov/protein/KAG2449294.1.
Prochnik et al. "hypothetical protein VOLCADRAFT_93629 [*Volvox car!eri* f. *nagariensis*]" Aug. 13, 2010: Retrieved from the internet on Oct. 25, 2023: <URL: https://www.ncbi.nlm.nih.gov/protein/XP002952908.1.
Bogen et al. "NCBI Reference Sequence: XP_013892539.1 (Serine/threonine-protein kinase PAK 7 [Monoraphidium neglectum])" Sep. 10, 2015; Retrieved from the internet on Oct. 25, 2023: <URL:https://www.ncbi.nlm.nih.gov/protein/XP013892539.1.
PCT International Search Report dated Sep. 24, 2018 in related PCT Application No. PCT/US2018/038365.
PCT International Search Report dated Aug. 19, 2022 in related PCT Application No. PCT/US2022/022316.
PCT International Search Report dated Sep. 22, 2011 in related PCT Application No. PCT/US2023/024573.
Extended European Search Report dated May 11, 2021 in related European Application No. 18820070.3.
Office Action Dated Jul. 19, 2022 in corresponding Japanese Patent Application No. 2019-570511.
Office Action Dated Mar. 19, 2024 in corresponding Japanese Patent Application No. 2023-006767.
Extended European Search Report dated Oct. 8, 2024 in related European Application No. 23193070.2.
Lambert, V., et al., "Laser-Induced Choroidal Neovascularization Model to Study Age Related Macular Degeneration in Mice," Nature Protocols, vol. 8, No. 11, Nov. 2013, pp. 2197-2211.
Feichtinger, R.G., et al., "Mitochondrial dysfunction: a neglected component of skin diseases", Experimental Dermatology vol. 23, Issue 9, Sep. 2014 (607-614); https://doi.org/10.1111/exd.12484.
Murphy, M. et al., "Mitochondria as a Therapeutic Target for Common Pathologies", Nature Reviews: Drug Discovery, Dec. 2018;17(12):865-886. doi: 10.1038/nrd.2018.174. Epub Nov. 5, 2018.
Picard, M. et al., "An Energetic View of Stress: Focus on Mitochondria", Frontiers in Neuroendocrinology 49 (2018) 72-85.
Giulivi, et al., "Mitochondrial Dysfunction in Autism", Journal of the American Medical Association, 2010;304:2389-2396.
Chauhan et al., "Brain region•specific deficit in mitochondrial electron transport chain complexes in children with autism", Journal of Neurochemistry 2011; 117:209-22.
Tang, et al., "Mitochondrial abnormalities in temporal lobe of autistic brain", Neurobiology of Disease 2013;54:349-361.
Goh et al., "Mitochondrial Dysfunction as a Neurobiological Subtype of Autism Spectrum Disorder: Evidence from brain imaging", JAMA Psychiatry Jun. 2014; vol. 71 No. 6, 665-671.
Napoli, et al., "Deficits in bioenergetics and impaired immune response in granulocytes from children with autism", Pediatrics May 2014; vol. 133 No. 5, 1405-10.
Rose et al, "Oxidative stress induces mitochondrial dysfunction in a subset of autism lymphoblastoid cell lines in a well-matched case control cohort", PLOS One 2014;9:e85436.
Parikh et al., "A Modern Approach to the Treatment of Mitochondrial Disease", Current Treatment Options in Neurology. 2009; 11 : 414-430.
Geier, et al., "A prospective double-blind, randomized clinical trial of levocarnitine to treat autism spectrum disorders", Med Sci Monit 2011; 17(6): PI15-23.

ALG-3002 (P2) Protection Against HQ and CCCP Stress in RPE Cells

ALG-3002 (P2) Reduction of Reactive Oxygen Species in HQ Stressed RPE Cells

ALG-3004 Reduction of Reactive Oxygen Species in HQ Stressed RPE Cells

ALG-3007 Reduction of Reactive Oxygen Species in HQ Stressed RPE Cells

ALG-3002 (P2) Improvement of Mitochondrial Membrane Potential in HQ Stressed RPE Cells ALG-3004 (P4) Improvement of Mitochondrial Membrane Potential in HQ Stressed RPE Cells

TREATMENTS FOR DISEASES AND DISORDERS THAT INVOLVE OXIDATIVE STRESS

RELATED APPLICATIONS

This patent application claims priority to U.S. Provisional Patent Application No. 63/350,373 entitled Treatments for Diseases and Disorders That Involve Oxidative Stress filed Jun. 8, 2022, the entire disclosure of which is expressly incorporated herein by reference. Additionally, this patent application is a continuation in part of copending U.S. patent application Ser. No. 16/882,656 entitled Peptide Compounds and Related Methods filed May 25, 2020, which is a division of U.S. patent application Ser. No. 16/012,706 filed Jun. 19, 2018, now abandoned, which claims priority to U.S. Provisional Patent Application No. 62/521,984 entitled Peptide Compositions and Related Methods filed Jun. 19, 2017, the entire disclosure of each such application being expressly incorporated herein by reference.

SEQUENCE LISTING

The instant application contains a Sequence Listing which has been submitted electronically in XML file format and is hereby incorporated by reference in its entirety. Said XML copy, created on Aug. 29, 2023, is named ALLEG-022A_SL.xml and is 14,504 bytes in size.

FIELD

The present disclosure relates generally to the fields of chemistry, life sciences, pharmacy, and medicine and more particularly to pharmaceutical preparations and their uses in the treatments of disease.

BACKGROUND

Pursuant to 37 CFR 1.71(e), this patent document contains material which is subject to copyright protection and the owner of this patent document reserves all copyright rights whatsoever.

Risuteganib (sometimes referred to herein as RSG), is a non-natural peptide having the molecular formula $C_{22}H_{39}N_9O_{11}S$ and the following structural formula, (SEQ ID NO: 2):

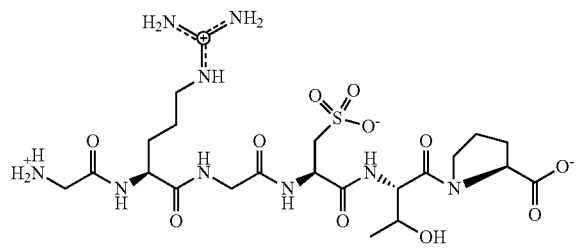

Risuteganib (RSG) and/or formulations in which it is contained as a primary active component have also been referred to by other names, nomenclatures and designations, including: ALG-1001; Gly-Lys-Gly-Asp-Thr-Pro (SEQ ID NO: 1), Glycyl-L-arginylglycyl-3-sulfo-L-alanyl-L-threo-nyl-L-proline (SEQ ID NO: 2); Arg-Gly-NH—CH(CH$_2$—SO$_3$H)COOH; and Luminate® (Allegro Ophthalmics, LLC, San Juan Capistrano, CA). Risuteganib has been shown to downregulate a number of integrins upstream in the oxidative stress pathway. Risuteganib acts broadly to downregulate multiple angiogenic and inflammatory processes, including those associated with oxidative stress.

Additional description of and information relating to Risuteganib and other compounds is provided in U.S. Pat. Nos. 9,018,352; 9,872,886; 9,896,480 and 10,307,460 and in United States Patent Application Publication Nos. 2018/0207227 and 2019/0062371 and co-pending U.S. Provisional Patent Applications No. 62/836,858 filed Apr. 22, 2019 entitled Compositions And Methods Useable For Treatment Of Dry Eye and 62/879281 filed Jul. 26, 2019 entitled Peptides For Treating Dry Macular Degeneration And Other Disorders Of The Eye, the entire disclosure of each such patent and patent application being expressly incorporated herein by reference.

Excessive formation of reactive oxygen species (ROS), such as free radicals, and impairment of defensive antioxidant systems can generally lead to a condition known as oxidative stress. Mitochondrial Respiration is a major source of free radicals believed to be responsible for oxidative stress in many diseases and disorders. Mitochondria are organelles found within many types of cells. Mitochondria function to create energy by generating adenosine triphosphate (ATP), which fuels many of the body's functions. Because muscle and nerve cells have high energy demands, mitochondrial dysfunction is frequently manifested in the form of a muscular or neurological disorder. Mitochondrial disorders that primarily affect muscles are sometimes referred to as mitochondrial myopathies. Mitochondrial disorders that primarily affect nerves are sometimes referred to as mitochondrial neuropathies or mitochondrial encephalomyopathies. Mitochondrial dysfunction can contribute to a wide variety of disorders, such as neurodegeneration, metabolic disease, congestive heart failure, chronic heart failure with reduced ejection fraction, chronic heart failure with preserved ejection fraction, Barth syndrome, kidney disease and kidney failure due to percutaneous renal angiography for renal artery stenosis, skeletal muscle function in the elderly, primary muscle mitochondrial myopathy and neuropathy, ischemia-reperfusion injury and protozoal infections. Murphy, M.; *Mitochondria as a Therapeutic Target for Common Pathologies; Nature Reviews*: Drug Discovery, 2018 December; 17(12):865-886. doi: 10.1038/nrd.2018.174. Epub 2018 Nov. 5. Mitochondria provide both the energy and signals that enable and direct adaptation to stress on a cellular level. Thus, See, Picard, M., et al.: *An Energetic View of Stress: Focus on Mitochondria; Frontiers in Neuroendocrinology* 49 (2018) 72-85. Also, mitochondrial dysfunction has been identified as a factor in the development of autism spectrum disorders. See, Giulivi, et al., *Mitochondrial Dysfunction in Autism. Journal of the American Medical Association.* 2010; 304:2389-2396; Chauhan, et al., *Brain region-specific deficit in mitochondrial electron transport chain complexes in children with autism.* Journal of Neurochemistry 2011; 117:209-22; Tang, et al., Mitochondrial abnormalities in temporal lobe of autistic brain. Neurobiology of Disease 2013; 54:349-361;

Goh, et al. *Mitochondrial Dysfunction as a Neurobiological Subtype of Autism Spectrum Disorder: Evidence from brain imaging.* JAMA Psychiatry 2014; 71:665-671; Napoli, et al., *Deficits in bioenergetics and impaired immune response in granulocytes from children with autism.* Pediatrics 2014; 133:e1405-10; Rose, et al., *Oxidative stress induces mitochondrial dysfunction in a subset of autism lymphoblastoid cell lines in a well-matched case control cohort.* PLOS One 2014; 9:e85436; Parikh, et al. *A Modern Approach to the Treatment of Mitochondrial Disease. Current Treatment Options in Neurology.* 2009; 11: 414-430; and Geier, et al. *A prospective double-blind, randomized clinical trial of levocarnitine to treat autism spectrum disorders.* Med Sci Monit 2011; 17:P115-23.

There exists a need for the development of new therapies for diseases and disorders that cause, are caused by or which otherwise involve inflammatory or oxidative stress and/or mitochondrial dysfunction and/or unwanted angiogenesis or neovascularization.

SUMMARY

As used herein the term "patient or "subject" refers to human or non-human animals, such as humans, primates, mammals, and vertebrates.

As used herein the term "treat" or "treating" refers to preventing, eliminating, curing, deterring, reducing the severity or reducing at least one symptom of a condition, disease or disorder.

As used herein the phrase "effective amount" or "amount effective to" refers to an amount of an agent that produces some desired effect at a reasonable benefit/risk ratio. In certain embodiments, the term refers to that amount necessary or sufficient to treat a specified condition or disorder. The effective amount may vary depending on such factors as the disease or condition being treated, the particular composition being administered, the route of administration, or the severity of the disease or condition. Persons of skill in the art may empirically determine the effective amount of a particular agent without necessitating undue experimentation.

Throughout this patent application amino acids or amino acid residues may be referred to interchangeably using the amino acid names, three letter codes and/or single letter codes as shown in the following Table 1:

TABLE 1

| Amino Acid | Three letter code | Single Letter Code |
|---|---|---|
| Alanine | Ala | A |
| Arginine | Arg | R |
| Asparagine | Asn | N |
| Aspartic Acid | Asp | D |
| Cysteine | Cys | C |
| Cysteic Acid | Cys(Acid) | — |
| Glutamic | Glu | E |
| Glutamine | Gln | Q |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |

TABLE 1-continued

| Amino Acid | Three letter code | Single Letter Code |
|---|---|---|
| Tyrosine | Tyr | Y |
| Valine | Val | V |

The present disclosure describes certain compounds and their uses for treating diseases and disorders that cause, are caused by or which otherwise involve oxidative stress, mitochondrial dysfunction and/or other effects and etiologies as described herein. In some embodiments, the compounds may be oligopeptides.

Compounds disclosed herein may comprise or consist of either a) the amino acid sequence Gly-Arg-Gly-Cys(acid)-Gly-Gly-Gly-Asp-Gly (SEQ ID NO: 3) or b) an amino acid sequence according to General Formula 1, below:

Gly-X-Thr-Pro              GENERAL FORMULA 1 wherein X is a three amino acid sequence selected from: Arg-Ala-Cys(Acid); Arg-Gly-Cys; Arg-Asp-Gly; Arg-Ala-Glu; Arg-Gly-Asn; Asp-Gly-Arg; Cys(acid)-Gly-Arg and Lys-Gly-Asp.

In some embodiments, where feasible, the compounds disclosed herein may be modified by adding one or more additional amino acids/residues to either the N-terminal or C-terminal end of the compound. In such embodiments the resultant (modified) amino acid sequence may include more than six (6) but less than eleven (11) amino acids/residues. In some such embodiments, the resultant (modified) amino acid sequence will have seven (7) amino acids/residues. In some such embodiments, the resultant (modified) amino acid sequence will have eight (8) amino acids/residues. In some such embodiments, the resultant (modified) amino acid sequence will have nine (9) amino acids/residues. In some such embodiments, the resultant (modified) amino acid sequence will have ten (10) amino acids/residues.

In some embodiments, compounds consisting of or comprising Gly-Arg-Gly-Cys(acid)-Gly-Gly-Gly-Asp-Gly (SEQ ID NO: 4) or General Formula 1 (above) may be modified by replacing the Gly at the N-terminal end by another amino acid/residue or other chemical entity selected from: Arg, Asp, His, Lys, Trp, Phe, Tyr, Met, Ala, Leu and Guanidino.

In some embodiments, compounds comprising General Formula 1 (above) may be modified by replacing one or both of the Thr-Pro amino acids/residues at the C-terminal end with one (1) or two (2) other amino acids/residues selected from: Ser, Val, Thr, Phe, Tyr, Lys and Asp.

In some embodiments, compounds comprising either Gly-Arg-Gly-Cys(acid)-Gly-Gly-Gly-Asp-Gly (SEQ ID NO: 3) or General Formula 1 (above) may be salts, such as, for example, a salt form selected from: hydrochloride salt, acetate salt, trifluoroacetate salt.

Also disclosed are pharmaceutical preparations comprising compounds comprising either Gly-Arg-Gly-Cys(acid)-Gly-Gly-Gly-Asp-Gly (SEQ ID NO: 3) or General Formula 1 (above) and/or the described modifications thereof in combination with at least one pharmaceutically-acceptable carrier, diluent, solvent or excipient.

Compounds disclosed herein include a series of Test Compounds which are referred to herein by the alphanumeric designations ALG-3001 through ALG-3009, or alternatively, P1 through P9, which have the amino acid sequences and structures specified in Table 2 below:

TABLE 2
| Compound | Amino Acid Sequence | Structural Formula |
|---|---|---|
| Risuteganib (RSG) (Prior Art) | GRGCys(acid)TP (SEQ ID NO: 2) Gly-Arg-Gly-Cys(acid)-Thr-Pro (SEQ ID NO: 2) | 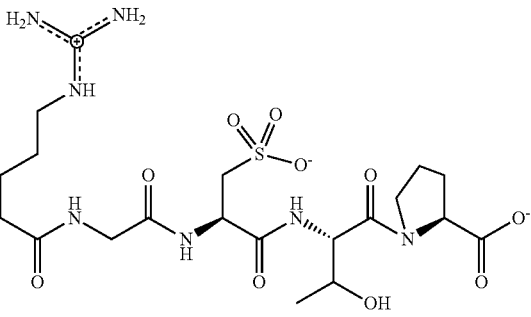 (SEQ ID NO: 2) |
| ALLEG-3001 (P1) | GRACys(acid)TP (SEQ ID NO: 5) Gly-Arg-Ala-Cys(acid)-Thr-Pro (SEQ ID NO: 5) | 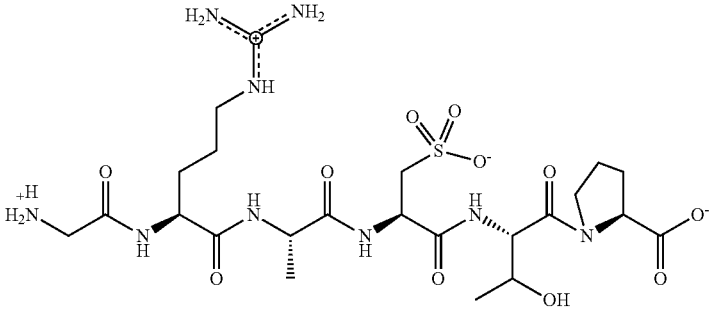 (SEQ ID NO: 5) |
| ALLEG-3002 (P2) | GRGCTP (SEQ ID NO: 6) Gly-Arg-Gly-Cys-Thr-Pro (SEQ ID NO: 6) | 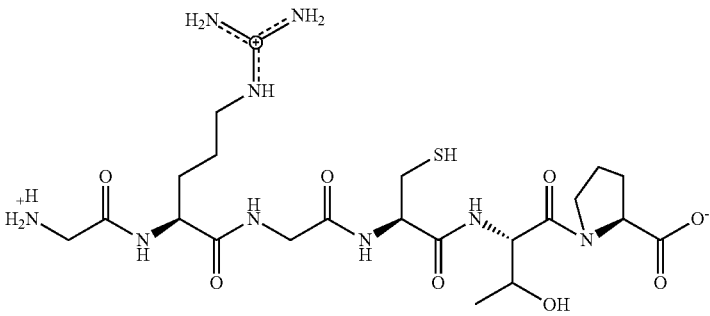 (SEQ ID NO: 6) |
| ALLEG-3003 (P3) | GRDGTP (SEQ ID NO: 7) Gly-Arg-Asp-Gly-Thr-Pro (SEQ ID NO: 7) | 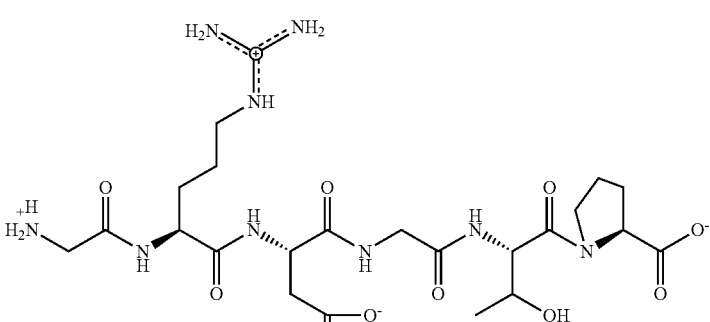 (SEQ ID NO: 7) |

TABLE 2-continued
| Compound | Amino Acid Sequence | Structural Formula |
|---|---|---|
| ALLEG-3004 (P4) | GRAETP (SEQ ID NO: 8) Gly-Arg-Ala-Glu-Thr-Pro (SEQ ID NO: 8) | 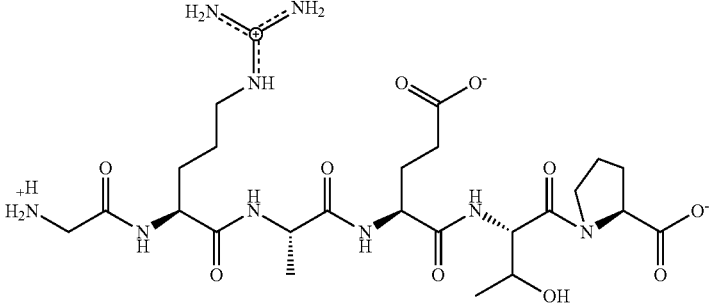<br>(SEQ ID NO: 8) |
| ALLEG-3005 (P5) | GRGNTP (SEQ ID NO: 9) Gly-Arg-Gly-Asn-Thr-Pro (SEQ ID NO: 9) | 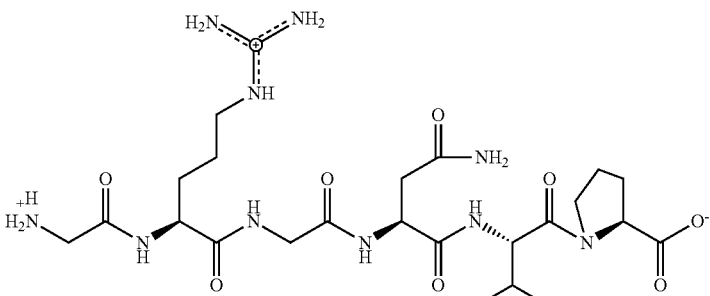<br>(SEQ ID NO: 9) |
| ALLEG-3006 (P6) | GRGCys(acid)GGGDG (SEQ ID NO: 3) Gly-Arg-Gly-Cys(acid)-Gly-Gly-Gly-Asp-Gly (SEQ ID NO: 3) | 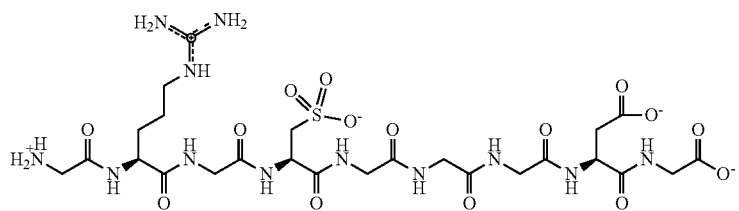<br>(SEQ ID NO: 3) |
| ALLEG-3007 (P7) | GDGRTP (SEQ ID NO: 10) Gly-Asp-Gly-Arg-Thr-Pro (SEQ ID NO: 10) | 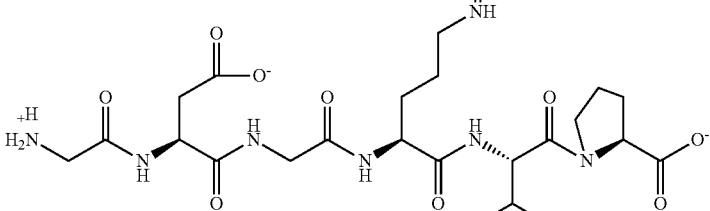<br>(SEQ ID NO: 10) |

TABLE 2-continued

| Compound | Amino Acid Sequence | Structural Formula |
|---|---|---|
| ALLEG-3008 (P8) | GCys(acid)GRTP (SEQ ID NO: 11) Gly-Cys(acid)-Gly-Arg-Thr-Pro (SEQ ID NO: 11) | 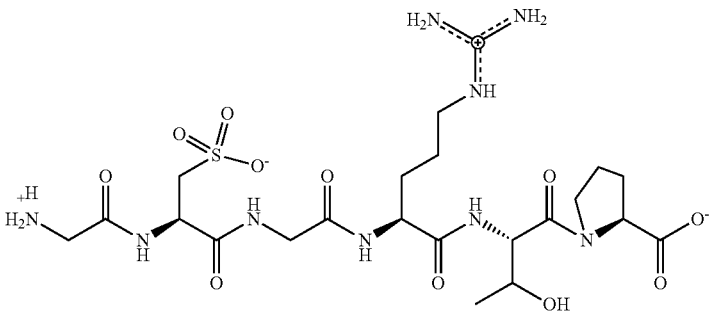 (SEQ ID NO: 11) |
| ALLEG-3009 (P9) | GKGDTP (SEQ ID NO: 1) Gly-Lys-Gly-Asp-Thr-Pro (SEQ ID NO: 1) | 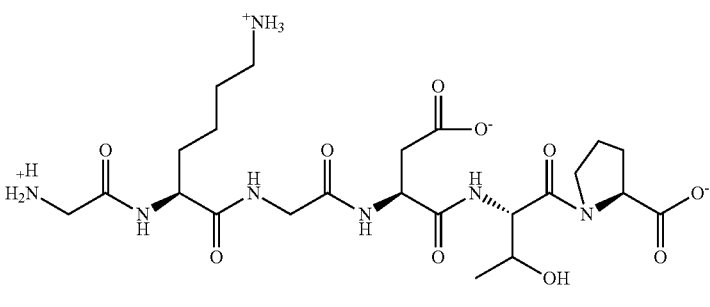 (SEQ ID NO: 1) |

Some of ALLEG-3001 through ALG-3009 (also referred to as P1 through P9) and other compounds have previously demonstrated effectiveness in inhibiting pathological neovascularization as described in incorporated U.S. patent application Ser. No. 16/882,656 entitled PEPTIDE COMPOSITIONS AND RELATED METHODS and Ser. No. 16/882,660 entitled PEPTIDE COMPOSITIONS AND RELATED METHODS.

The present disclosure includes uses and methods for using the disclosed compounds and pharmaceutical preparations containing such compound(s) for treatment of diseases and disorders in a human or animal subjects in need thereof including, for example, diseases or disorders that cause, are caused by or are associated with oxidative stress and/or mitochondrial dysfunction. Such method may comprise the step of administering to the subject a therapeutically effective amount of at least one disclosed compound or a pharmaceutical salt, ester or amide thereof and/or a pharmaceutical preparation which contains one or more of such compound(s). In some applications, the subject may be suffering from a disorder which causes, contributes to, or is caused by neovascularization, unwanted angiogenesis, inflammation, oxidative stress and/or impairment of mitochondrial bioenergetics. In such cases, the compound(s) may be administered in an amount which protects certain cells or tissues from the effects of oxidative stress and/or which reverses or prevents at least some impairment of mitochondrial bioenergetics such as, for example, a chemotoxic, hypoxic or ischemic insult, metabolic stress, heart failure, chronic heart failure with reduced ejection fraction, chronic heart failure with preserved ejection fraction, Barth syndrome, kidney disease, kidney failure due to percutaneous renal angiography for renal artery stenosis, impaired skeletal muscle function in the elderly, primary muscle mitochondrial myopathy or neuropathy, ischemia-reperfusion injury, protozoal infections, peripheral neuropathy, dermatologic disorders, neurodegenerative disease, retinal degenerations (e.g., such as dry macular degeneration, retinitis pigmentosa, glaucoma, Alzheimer's disease (AD), Parkinson's disease (PD), Huntington's disease (HD), amyotrophic lateral sclerosis (ALS), another disorder which causes progressive degeneration of function and/or structure of neurons of the central nervous system (CNS), a dermatologic disorder, a rash, pigmentation abnormality or acrocyanosis, pruritis, atopic dermatitis, psoriasis and hemorrhoids, a peripheral neuropathy, peripheral nerve pain, or nerve pain that causes, contributes to, or is caused by mitochondrial dysfunction, diabetes, abnormal glucose metabolism, oxidative stress or chemotherapy, heart failure or reduced cardiac output.

Hearing problems associated with tinnitus, or ringing in the ears, which is sounds that are thought to be developed by the cause of abnormal neural activity without sound stimuli and cannot be heard from the outside. It is seen in 10-17% of the general population and 33% of the elderly population. Although many factors, including acoustic trauma, stress, ototoxic drugs, metabolic diseases, otologic diseases, neurological diseases are accused in the etiopathogenesis, most of the cases remain idiopathic. Oxidative stress is strongly implicated as an underlying cause of tinnitus. Other otic disorders that may be treatable include other inflammations of the middle or inner ear, Mèniére's disease and other sensorineural hearing loss.

In general, the Test Compounds identified as ALG-3001 through ALG-3009 (i.e., P1 though P9) have been tested in a number of experimental models, including an in vivo OIR/ROP mouse model, which develops retinal neovascularization (NV) due to hypoxia as well as an in vitro donor retina pigment epithelium (RPE) cells stressed with high and low levels of hydroquinone (HO), a toxin found in cigarette smoke and air pollutants. The following Table 3 summarizes the results of this testing:

μM ALG-3001 (P1). Statistical significance or non-significance is denoted as follows: (N.S.=not significant, * P≤0.05,  P≤0.01, * P≤0.001, and **** P≤0.0001)

TABLE 3

| Compound | SEQ ID NO: | Amino Acid Code | % NV Reduction | % RPE Protection (Low HQ) | % RPE Protection (High HQ) |
|---|---|---|---|---|---|
| Risuteganib (RSG) | 2 | GRGCys(acid)TP | 47-64% | 12-38% | 13-20% |
| ALG-3001 (P1) | 5 | GRACys(acid)TP | 50-60% | 15% | 15% |
| ALG-3002 (P2) | 6 | GRGCTP | 66% | 80% | 81% |
| ALG-3003 (P3) | 7 | GRDGTP | 44% | 29% | 17% |
| ALG-3004 (P4) | 8 | GRAETP | 63% | 65% | 41% |
| ALG-3005 (P5) | 9 | GRGNTP | 64% | 53% | 16% |
| ALG-3006 (P6) | 3 | GRGCys(acid)GGGDG | 62% | 50% | 25% |
| ALG-3007 (P7) | 10 | GDGRTP | 56% | 48% | 31% |
| ALG-3008 (P8) | 11 | GCys(acid)GRTP | 63% | 36% | 12% |
| ALG-3009 (P9) | 1 | GKGDTP | 40% | 33% | 26% |

In some embodiments, any of ALG-3001 through ALG-3005 and ALG-3007 through ALG-3009, the N-terminal Arginine (G-) and C terminal Threonine-Proline (-T-P) may be modified or replaced by other amino acid(s) or groups of amino acids when doing so does not render the compound ineffective for its intended use. For example, in some embodiments, the N-terminal Gly may be replaced by an amino acid or other entity such as Arg, Asp, His, Lys, Trp, Phe, Tyr, Met, Ala, Leu or Guanidine (Guanidino group). For example, in some embodiments, one or both of the Thr-Pro at the C-terminal end may be replaced with other amino acid(s)/residue(s) selected from: Ser, Val, Thr, Phe, Tyr, Lys and Asp.

Still further aspects and details of the present disclosure will be understood upon reading of the detailed description and examples set forth herebelow.

DETAILED DESCRIPTION

Figure 1A:
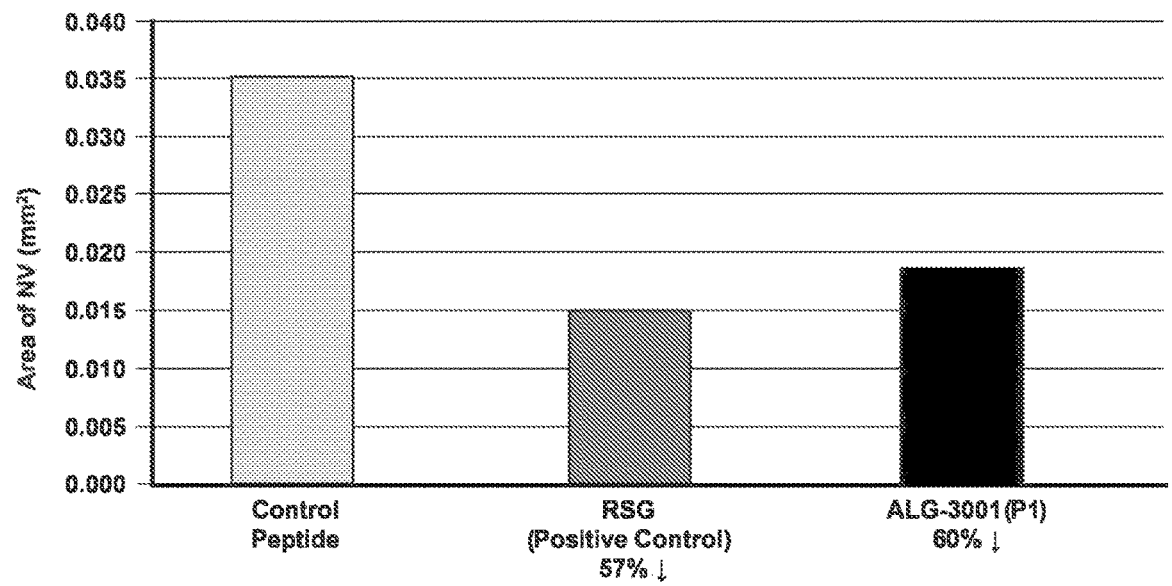
FIG. 1A is a bar graph comparing the effects of GRGETP (SEQ ID NO: 12) (Control Peptide), Risuteganib (RSG) (Positive Control) and ALG-3001 (P1) on retinal neovascularization in OIR (ocular ischemic retinopathy) mice in a first experiment.
Figure 1B:
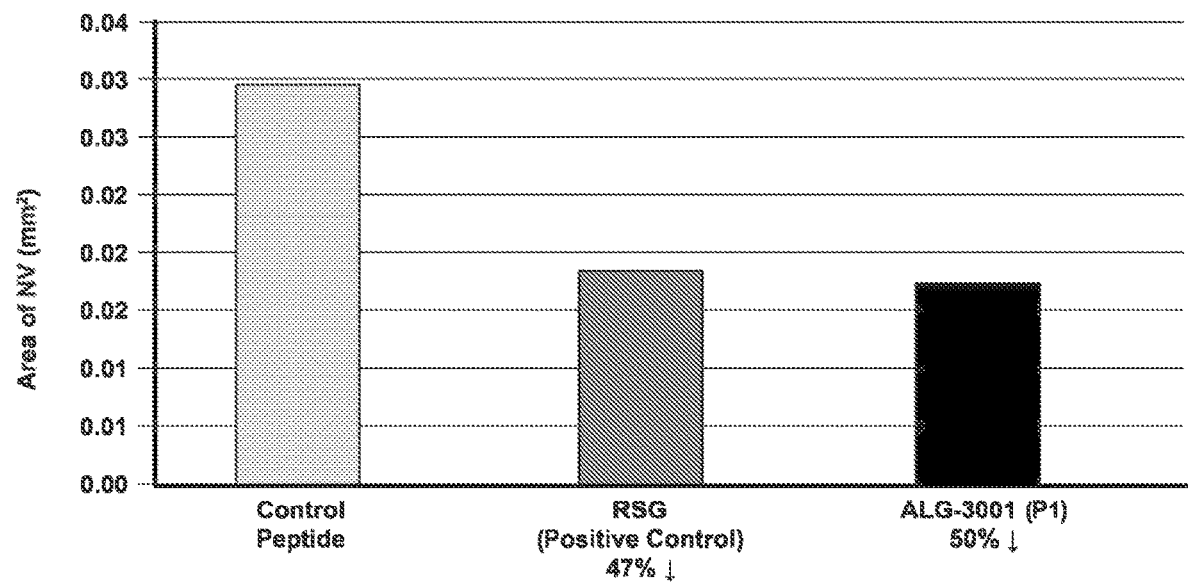
FIG. 1B is a bar graph comparing the effects of GRGETP (SEQ ID NO: 12) (Control Peptide), Risuteganib (RSG) (Positive Control) and ALG-3001 (P1) on retinal neovascularization in OIR mice in a second experiment.

The following detailed description and the accompanying drawings to which it refers are intended to describe some, but not necessarily all, examples or embodiments of the disclosed subject matter. The described examples or embodiments are to be considered in all respects only as illustrative and not restrictive. The contents of this detailed description and the accompanying drawings do not limit the scope of the disclosure in any way.

The treatments described in this patent application may be administered by any suitable route(s) of administration and in any suitable dosage form. Possible routes of administration known in the art include, but are not necessarily limited to: systemic, local, regional, parenteral, enteral, inhalational, topical, intramuscular, subcutaneous, intravenous, intravitreal, intra-arterial, intrathecal, intravesical, oral, endoscopic (e.g., through an endoscope, bronchoscope, colonoscope, sigmoidoscope, hysterscope, laproscope, athroscope, gastroscope, cystoscope, etc.), transurethral, trans-tympanic, rectal, nasal, oral, tracheal, bronchial, esophageal, gastric, intestinal, peritoneal, urethral, vesicular, urethral, vaginal, uterine, fallopian, buccal, lingual, sublingual and mucosal. Possible dosage forms known in the art include, but are not limited to: liquids, biphasic liquids, solids, semisolids, vapors, aerosols, solutions, suspensions, mixtures, syrups, linctuses, gels, creams, pastes, ointments, lotions, liniments, collodions, emulsions, transdermal delivery patches, suppositories, capsules, tablets, powders, granules, edibles, chewables, drops, sprays, enemas, douches, lozenges, etc.

In Vivo OIR/ROP Mouse Model Study of Retinal Neovascularization

In this study, Risuteganib (RSG), a known-active positive control having the amino acid sequence Gly-Arg-Gly-Cys (acid)-Thr-Pro (SEQ ID NO: 2), and each of Test Compounds (ALG-3001 through ALG-3009, alternately referred to as P1 through P9) were tested in comparison to a known inactive Control Peptide having the amino acid sequence Gly-Arg-Gly-Glu-Tyr-Pro (SEQ ID NO: 13) (RGE) (e.g., a negative control) for effectiveness in reducing retinal neovascularization in a mouse model of oxygen-induced retinopathy (OIR).

Methods: OIR mouse pups received 5 days of hyperoxia (75% 02) to obliterate developing retinal vessels. Following their return to room air, retinal neovascularization develops due to an imbalance in oxygen supply and demand. At the time of return to room air, eyes of OIR pups received a single intravitreal injection of either Control Peptide (known inactive), Positive Control (known active) or Test Compound, as follows:

| OIR STUDY TREATMENTS | | |
|---|---|---|
| TREATMENT | DESCRIPTION | DOSE |
| Control Peptide | GRGETP (SEQ ID NO: 12) | 10 μg per Eye |
| Positive Control | Risuteganib (SEQ ID NO: 2) | 10 μg per Eye |
| Test Compounds | ALG-3001-ALG-3009 | 10 μg per Eye |

Injectate solutions were prepared by dissolving either Control Peptide, Risuteganib or a Test Compound in 0.9% NaCl saline at a concentration of 10 μg per μL. One microliter (1.0 μL) of each solution was injected intraviterally into each eye, thereby delivering the indicated dose of 10 μg per eye. Eighteen (18) days after injection, the mice were euthanized and the retinas were removed and stained with flurescein-labeled dextran for fluorescein microscopy. The prepared retinas were then examined microscopically and the area of each retina exhibiting neovascularization was measured.

Results: The results of this study are summarized in Table 3 (above), Table 4 (below) and in FIGS. 1A, 1B, 2A, 3A, 4A, 5A, 7A, 8A, 9A and 10.

TABLE 4

| Test Compound | % NV Reduction Compared to Control Peptide |
|---|---|
| ALG-3001 (P1) | 60 |
| ALG-3001 (P1) | 50 |
| ALG-3002 (P2) | 66 |
| ALG-3003 (P3) | 44 |
| ALG-3004 (P4) | 63 |
| ALG-3005 (P5) | 64 |
| ALG-3006 (P6) | 62 |
| ALG-3007 (P7) | 56 |
| ALG-3008 (P8) | 63 |
| ALG-3009 (P9) | 40 |

Risuteganib (RSG), the positive control, caused 47-64% reduction in neovascular area compared to the inactive Control Peptide (GRGETP (SEQ ID NO: 12)). All Test Compounds (ALG-3001 (P1) through ALG-3009 (P9)) caused a reduction in neovascular area comparable to that caused by risuteganib (RSG).

In Vitro Cell Culture Study of ALG-3001 to ALG-3009 (P1 Through P9) in Stressed Retinal Pigment Epithelium (RPE) Cells In this study, ALG-3001 through ALG-3009 (alternately referred to as P1 through P9) were tested for their cytoprotective, mitochondrial stabilization and other therapeutic properties in a human RPE cell culture model. The cells were stressed with the cigarette smoke toxin, hydroquinone, which is known to reduce cell viability, elevate reactive oxygen species (ROS) and reduce mitochondrial function. This model replicates the disease scenario of retinal degenerations and specifically dry macular degeneration.

RPE cells form a monolayer of highly specialized, polarized epithelial cells interposed between the choriocapillaris and photoreceptors. RPE cells play an important role in retinal homeostasis and are vital to photoreceptor cell health and visual function.

RPE cell dysfunction or death is thought to be an important contributor to age-related macular degeneration (AMD). RPE cells are continually exposed to oxidants throughout life and oxidative stress plays a major role in AMD pathogenesis and progression. Cigarette smoke contains high concentrations of free oxidants and has been implicated as a major environmental risk factor for AMD. Hydroquinone (HQ), a major oxidant in both tobacco smoke and atmospheric pollutants, increases reactive oxygen species (ROS) generation and promotes oxidative stress.5 ROS, a group of unstable oxygen-containing molecules that can easily react with other molecules in a cell, are generated during cellular metabolism and in response to various stimuli. In cells, the major site of ROS production is the mitochondrial electron transport chain, where some electrons leak from the transport process and spontaneously react with molecular oxygen, producing superoxide anion. ROS have important physiological functions; however, excess ROS can cause RPE cell oxidative damage.

Methods: Human donor eyes from a 62-year-old male donor were obtained from an Organ Donor and Eye Bank in accordance with the provisions of the Declaration of Helsinki for research involving human tissue. Cells were grown in Eagle's minimal essential medium (MEM; Invitrogen) with 10% fetal bovine serum (Thermo Scientific) and with 1× penicillin/streptomycin (Thermo Scientific) at 37° C. in a humidified environment containing 5% $CO_2$. Human donor RPE cells were seeded on collagen-coated plates. On day 6 after plating, cells were washed twice with serum-free, phenol red-free MEM (SF-MEM), and treated with HQ in the presence or absence of peptide drugs in SF-MEM for various times at 37° C.

For WST assay, RPE cells in triplicate wells of a 96-well plate were treated with differing concentrations of HQ (ranging from 140 μM to 170 μM) for 2.5 hours in the presence either: No Treatment (control); 400 μM Risuteganib (RSG) (Positive Control) or Test Compounds (ALG-3001 through ALG-3009) at concentrations of 100 μM, 400 μM and 800 μM. One of the Test Compounds, ALG-3002, was ALG-3002 was additionally tested at concentrations of 12.5 μM, 25 μM, 50 μM and 100 μM.

Following the initial 2.5. hour incubation, the medium was removed and the cells were incubated with WST-1 solution for 30 minutes at 37° C. A colorimetric assay was performed based on the cleavage of the tetrazolium salt WST-1 by mitochondrial dehydrogenases in viable cells. The plate was read on a spectrophotometer at 440 nm with a reference wavelength at 690 nm.

For ROS assay, RPE cells in triplicate wells of 96-well black plates with clear bottoms were washed with SF-MEM, loaded with 20 μM CM-H2DCFDA in SF-MEM for 30 minutes at 37° C. and then washed twice. Cells were then treated with HQ (160 μM) in the presence or absence of peptide drugs. Fluorescence was measured at various times with a fluorescence plate reader (490 nm excitation, 522 nm emission).

For mitochondria membrane potential measurement, RPE cells in triplicate wells of 96-well black plates with clear bottoms were washed with SF-MEM, loaded with 10 μM JC-1 dye in SF-MEM for 30 minutes at 37° C. and then washed twice. Cells were then treated with HQ (160 μM) with or without RSG (0.4 mM). A fluorescence plate reader was used to measure the fluorescence at various times to quantify green JC-1 monomer (490 nm excitation, 522 nm emission) and red JC-1 aggregates (535 nm excitation, 590 nm emission).

For glutathione (GSH) assay, RPE cells in triple wells of 96-well plate were washed with SF-MEM, treated with HQ with and without peptide drugs. After 1.5 hours treatment, cell medium was removed and GSH-Glo was added for 30 minutes incubation at room temperature. Next, detection reagent was added for 15 minutes incubation at room temperature. A plate reader was used to measure the relative luminescence unit, followed by LDH assay through collection of supernatant.

Data are expressed as the mean±standard deviation. Two-way ANOVA with Tukey multiple comparisons correction was used to determine whether there were statistically significant differences between treatment groups. Results were plotted using GraphPad Prism 9.0 with asterisks indicating the magnitude of P value (N.S.=not significant, * $P \leq 0.05$,  $P \leq 0.01$, * $P \leq 0.001$, and **** $P \leq 0.0001$).

Results: Results showing the cytoprotective effects of the Test Compounds are summarized in Tables 5 and 6 (below):

TABLE 5

Increased Cell Viability Observed When RSG (Positive Control) and Test Compounds ALG-3001 (P1) through 3009 (P9) Combined With 140 µM-170 µM of HQ Toxin

| Control VS HQ | HQ VS-RSG | HQ VS ALG-300X | HQ VS ALG-300X |
|---|---|---|---|
| HQ 150 µM & ALG-3001 - CELL VIABILITY (% of MEM) | | | |
| Control | HQ | HQ + 400 µM RSG | HQ + 400 µM ALG-3001 | HQ + 800 µM ALG-3001 |
| 100% | 12%**** | 24%** | 27%*** | 37%**** |
| HQ 170 µM & ALG-3001 - CELL VIABILITY | | | |
| 100% | 13%**** | 29%** | 27%**** | 53%**** |
| HQ 140 µM & ALG-3002 - CELL VIABILITY (% of MEM) | | | |
| Control | HQ | HQ + 400 µM RSG | HQ + 25 µM ALG-3002 | HQ + 100 µM ALG-3002 |
| 100% | 20%**** | 44%**** | 123%**** | 116%**** |
| HQ 160 µM & ALG-3002 - CELL VIABILITY | | | |
| Control | HQ | HQ + 400 µM RSG | HQ + 50 µM ALG-3002 | HQ + 100 µM ALG-3002 |
| 100% | 11%**** | 31%**** | 161%**** | 163%**** |
| HQ 140 µM & ALG-3003 - CELL VIABILITY (% of MEM) | | | |
| Control | HQ | HQ + 400 µM RSG | HQ + 400 µM ALG-3003 | HQ + 800 µM ALG-3003 |
| 100% | 20%**** | 44%**** | 50%**** | 73%**** |
| HQ 160 µM & ALG-3003 - CELL VIABILITY | | | |
| 100% | 11%**** | 31%**** | 50%**** | 54%**** |
| HQ 140 µM & ALG-3004 - CELL VIABILITY (% of MEM) | | | |
| Control | HQ | HQ + 400 µM RSG | HQ + 400 µM ALG-3004 | HQ + 800 µM ALG-3004 |
| 100% | 29%**** | 67%*** | 94%**** | 99%**** |
| HQ 160 µM & ALG-3004 - CELL VIABILITY | | | |
| 100% | 20%**** | 39%*** | 60%**** | 90%**** |
| HQ 140 µM & ALG-3005 - CELL VIABILITY (% of MEM) | | | |
| Control | HQ | HQ + 400 µM RSG | HQ + 400 µM ALG-3005 | HQ + 800 µM ALG-3005 |
| 100% | 29%*** | 67%*** | 82%**** | 95%**** |
| HQ 160 µM & ALG-3005 - CELL VIABILITY | | | |
| 100% | 20%**** | 39%*** | 36%*** | 70%**** |
| HQ 140 µM & ALG-3006 - CELL VIABILITY (% of MEM) | | | |
| Control | HQ | HQ + 400 µM RSG | HQ + 400 µM ALG-3006 | HQ + 800 µM ALG-3006 |
| 100% | 33%**** | 61%**** | 83%**** | 113%**** |
| HQ 160 µM & ALG-3006 - CELL VIABILITY | | | |
| 100% | 14%** | 31% | 39%*8 | 66%** |
| HQ 140 µM & ALG-3007 - CELL VIABILITY (% of MEM) | | | |
| Control | HQ | HQ + 400 µM RSG | HQ + 400 µM ALG-3007 | HQ + 800 µM ALG-3007 |
| 100% | 33%**** | 61%*** | 81%**** | 97%**** |

TABLE 5-continued

Increased Cell Viability Observed When RSG (Positive Control) and Test Compounds ALG-3001 (P1) through 3009 (P9) Combined With 140 μM-170 μM of HQ Toxin

| HQ 160 μM & ALG-3007 - CELL VIABILITY | | | | |
|---|---|---|---|---|
| 100% | 14%**** | 31%** | 45%**** | 73%**** |

| HQ 140 μM & ALG-3008 - CELL VIABILITY (% of MEM) | | | | |
|---|---|---|---|---|
| Control | HQ | HQ + 400 μM RSG | HQ + 400 μM ALG-3008 | HQ + 800 μM ALG-3008 |
| 100% | 41%**** | 75%*** | 77%*** | 81%**** |

| HQ 160 μM & ALG-3008 - CELL VIABILITY | | | | |
|---|---|---|---|---|
| 100% | 26%**** | 40%* | 38% NS | 65%**** |

| HQ 140 μM & ALG-3009 - CELL VIABILITY (% of MEM) | | | | |
|---|---|---|---|---|
| Control | HQ | HQ + 400 μM RSG | HQ + 400 μM ALG-3009 | HQ + 800 μM ALG-3009 |
| 100% | 41%**** | 75%**** | 74%*** | 69%*** |

| HQ 160 μM & ALG-3009-CELL VIABILITY | | | | |
|---|---|---|---|---|
| 100% | 26%**** | 40%**** | 52%**** | 74%**** |

NS = not significant,
*P ≤ 0.05,
**P ≤ 0.01,
***P ≤ 0.001, and
****P ≤ 0.0001
In the above experiments HQ + 400 μM of RSG increases the Cell Viability of the cells above the levels dimished by HQ exposure.
In the above experiments HQ + 400 μM of ALG-3001 to ALG-3009, and HQ + 800 μM of ALG-3001 to ALG-3009 increase significantly the Cell Viability of the cells above the levels dimished by HQ exposure.

Table 6 (below) compares the amino acid sequence and highest observed RIPE cell viability in HQ-stressed cells for each Test Compound (ALLEG-3001-3009 (P1-P9) as well as the positive control risuteganib (RSG).

TABLE 6

| Compound | SEQ ID NO: | Amino Acid Sequence | Amino Acid Code | Highest RPE Viability |
|---|---|---|---|---|
| ALG-3001(P1) | 5 | Gly-Arg-Ala-Cys(acid)-Thr-Pro | GRACys(acid)TP | 53% |
| ALG-3002(P2) | 6 | Gly-Arg-Gly-Cys-Thr-Pro | GRGCTP | 163% |
| ALG-3003(P3) | 7 | Gly-Arg-Asp-Gly-Thr-Pro | GRDGTP | 73% |
| ALG-3004(P4) | 8 | Gly-Arg-Ala-Glu-Thr-Pro | GRAETP | 99% |
| ALG-3005(P5) | 9 | Gly-Arg-Gly-Asn-Thr-Pro | GRGNTP | 95% |
| ALG-3006(P6) | 3 | Gly-Arg-Gly-Cys(acid)-Gly-Gly-Gly-Asp-Gly | GRGCys(acid)GGGDG | 113% |
| ALG-3007(P7) | 10 | Gly-Asp-Gly-Arg-Thr-Pro | GDGRTP | 97% |
| ALG-3008(P8) | 11 | Gly-Cys(acid)-Gly-Arg-Thr-Pro | GCys(acid)GRTP | 81% |
| ALG-3009(P9) | 1 | Gly-Lys-Gly-Asp-Thr-Pro | GKGDTP | 74% |
| Risuteganib | 2 | Gly-Arg-Gly-Cys(acid)-Thr-Pro | GRGCys(acid)TP | N/A |

Figure 1C:
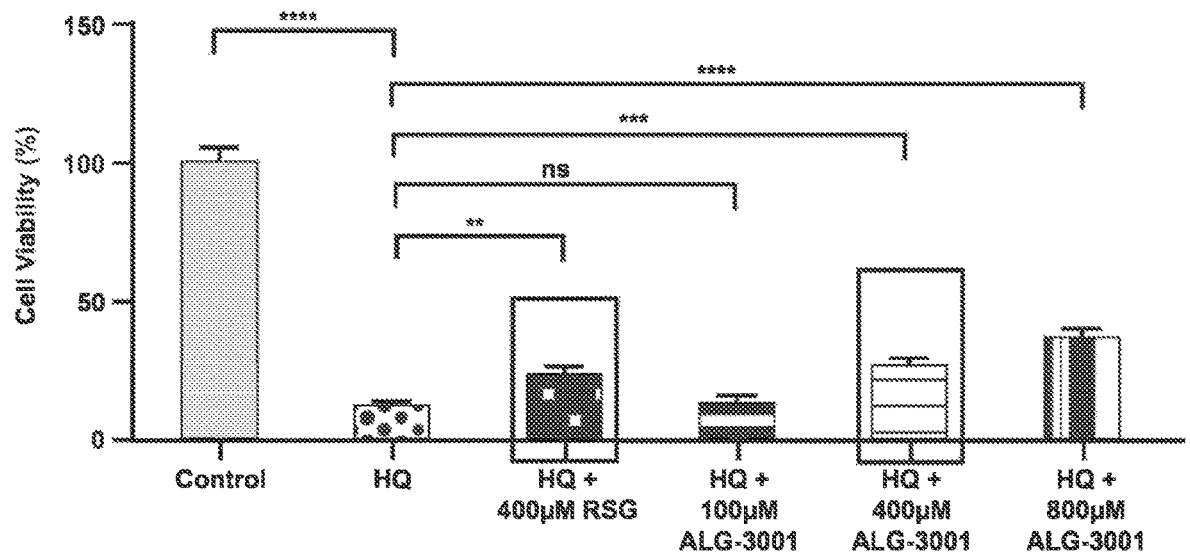
FIG. 1C is a bar graph comparing the effects of Control (serum-free, phenol red-free MEM (SF-MEM)), 150 μM Hydroquinone (HQ) alone, and 150 μM Hydroquinone (HQ) in combination with each of: 400 μM Risuteganib (RSG), 100 μM ALG-3001 (P1), 400 μM ALG-3001 (P1) and 800 μM ALG-3001 (P1). Statistical significance or non-significance is denoted as follows: (N.S.=not significant, * P≤0.05,  P≤0.01, * P≤0.001, and **** P≤0.0001)
Figure 1D:
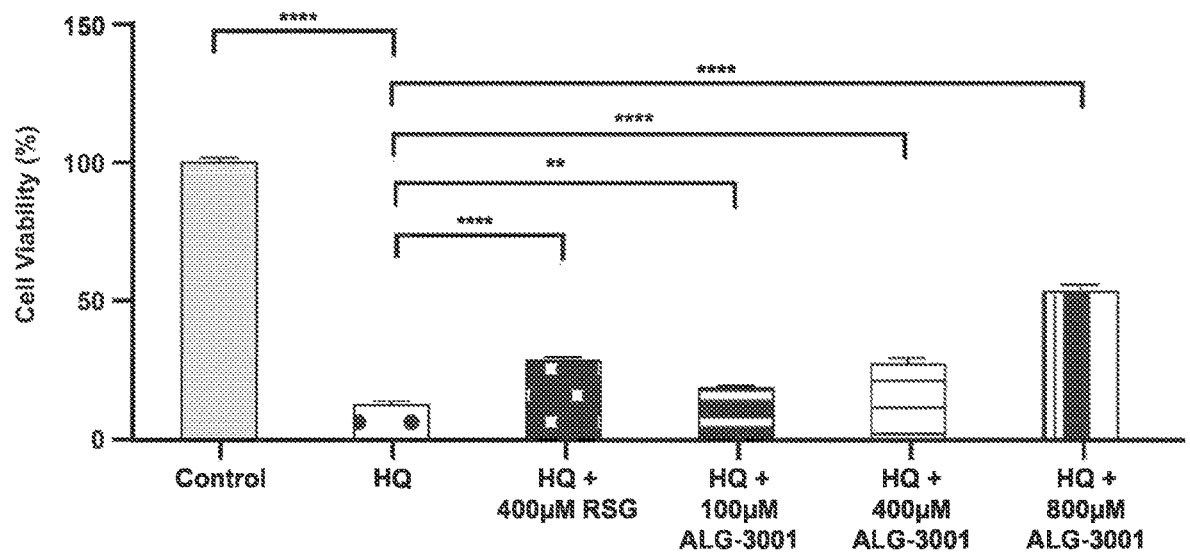
FIG. 1D is a bar graph comparing the effects of Control (SF-MEM), 170 μM Hydroquinone (HQ) alone, and 170 μM Hydroquinone (HQ) in combination with each of: 400 μM Risuteganib (RSG), 100 μM ALG-3001 (P1), 400 μM ALG-3001 (P1) and 800 μM ALG-3001 (P1). Statistical significance or non-significance is denoted as follows: (N.S.=not significant, * P≤0.05,  P≤0.01, * P≤0.001, and **** P≤0.0001)
Figure 2A:
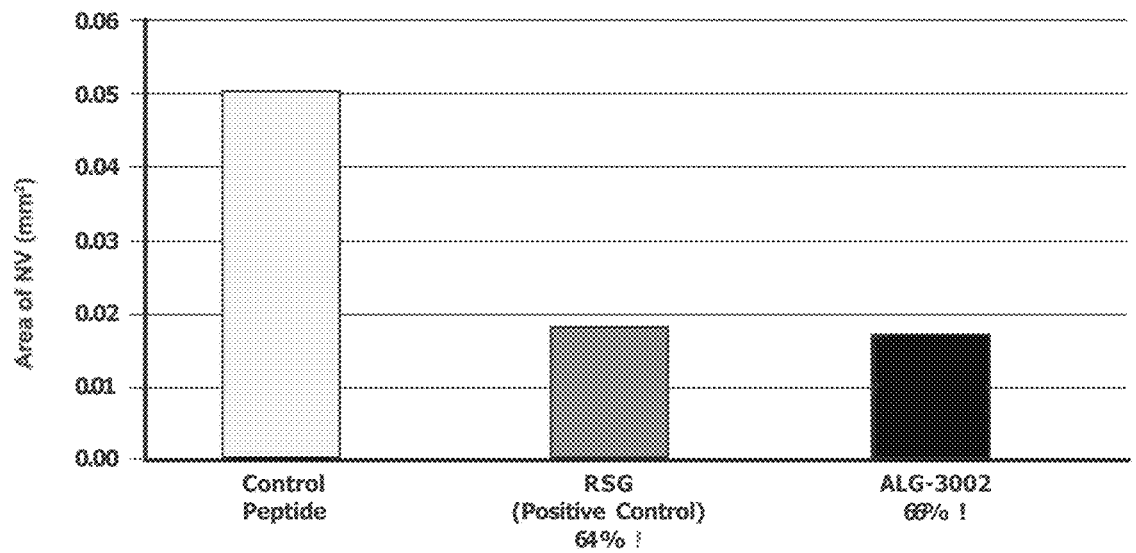
FIG. 2A is a bar graph comparing the effects of GRGETP (SEQ ID NO: 12) (Control Peptide), Risuteganib (RSG) (Positive Control) and ALG-3002 (P2) on retinal neovascularization in OIR mice in a second experiment.
Figure 2B:
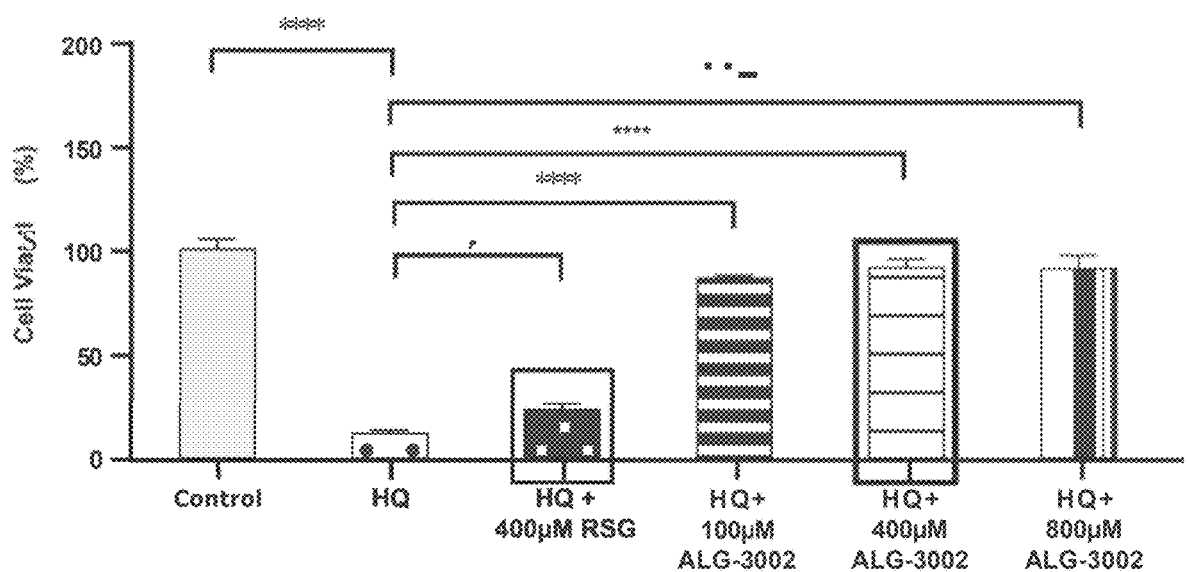
FIG. 2B is a bar graph comparing the effects of Control (SF-MEM), 170 μM Hydroquinone (HQ) alone, and 170 μM Hydroquinone (HQ) in combination with each of: 400 μM Risuteganib (RSG), 100 μM ALG-3002 (P2), 400 μM ALG-3002 (P2) and 800 μM ALG-3002 (P2). Statistical significance or non-significance is denoted as follows: (N.S.=not significant, * P≤0.05,  P≤0.01, * P≤0.001, and **** P≤0.0001).
Figure 2C:
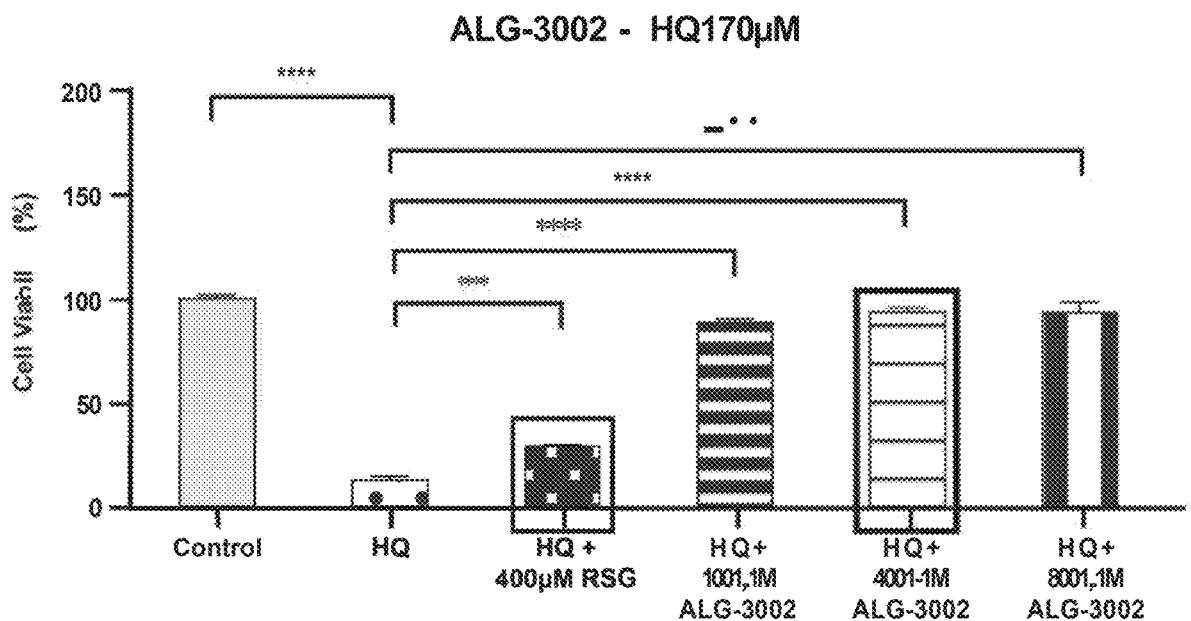
FIG. 2C is a bar graph comparing the effects of Control (SF-MEM), 160 μM Hydroquinone (HQ) alone, and 160 μM Hydroquinone (HQ) in combination with each of: 400 μM Risuteganib (RSG), 100 μM ALG-3002 (P2), 400 μM ALG-3002 (P2) and 800 μM ALG-3002 (P2). Statistical significance or non-significance is denoted as follows: (N.S.=not significant, * P≤0.05,  P≤0.01, * P≤0.001, and **** P≤0.0001).
Figure 2D:
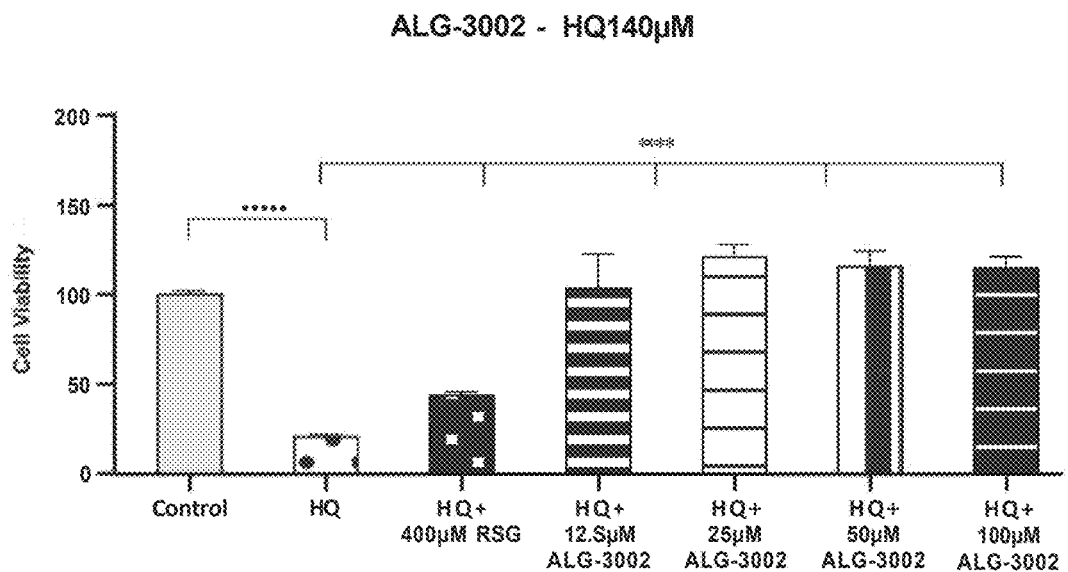
FIG. 2D is a bar graph comparing the effects of Control (SF-MEM), 140 μM Hydroquinone (HQ) alone, and 140 μM Hydroquinone (HQ) in combination with each of: 400 μM Risuteganib (RSG), 12.5 μM ALG-3002 (P2), 25 μM ALG-3002 (P2), 50 μM ALG-3002 (P2) and 100 μM ALG-3002 (P2).
Figure 2E:
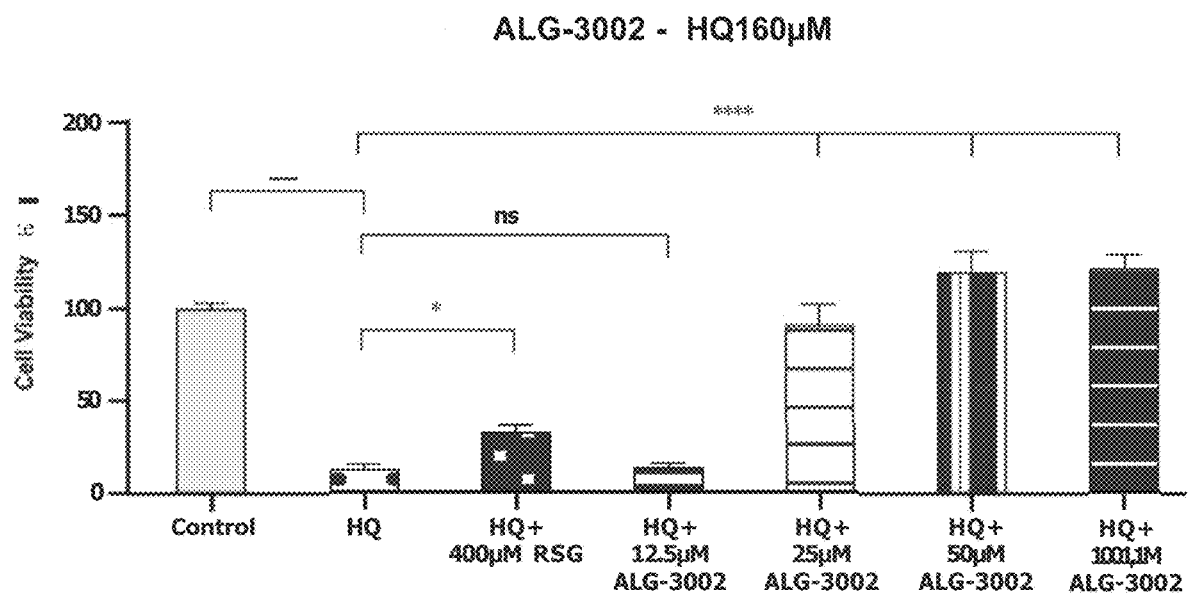
FIG. 2E is a bar graph comparing the effects of Control (SF-MEM), 160 μM Hydroquinone (HQ) alone, and 160 μM Hydroquinone (HQ) in combination with each of: 400 μM Risuteganib (RSG), 12.5 μM ALG-3002 (P2), 25 μM ALG-3002 (P2), 50 μM ALG-3002 (P2) and 100 μM ALG-3002 (P2).
Figure 3A:
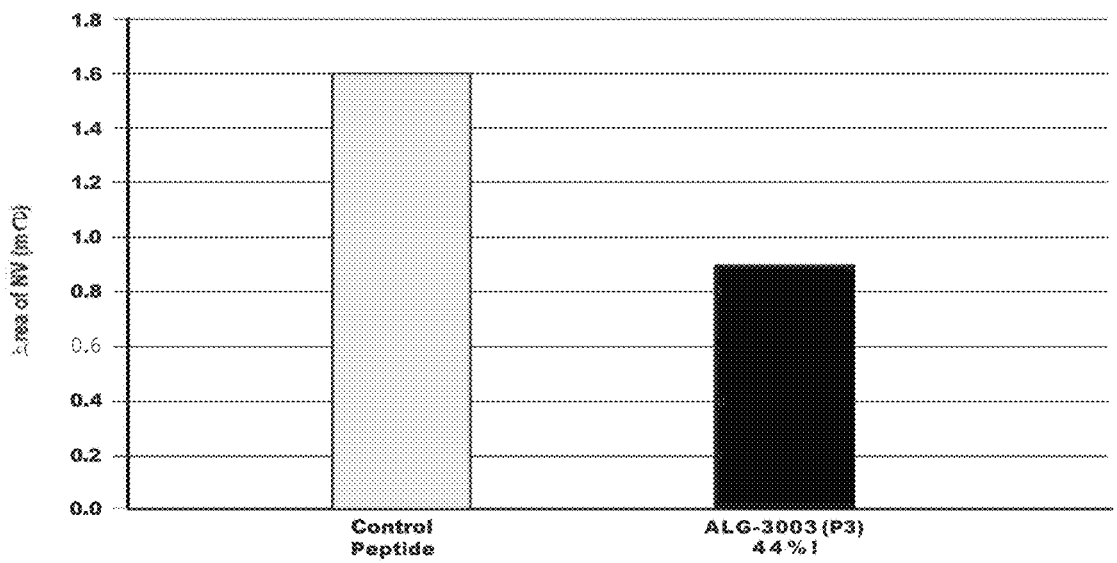
FIG. 3A is a bar graph comparing the effects of GRGETP (SEQ ID NO: 12) (Control Peptide) and ALG-3003 (P3) on retinal neovascularization in OIR mice.
Figure 3B:
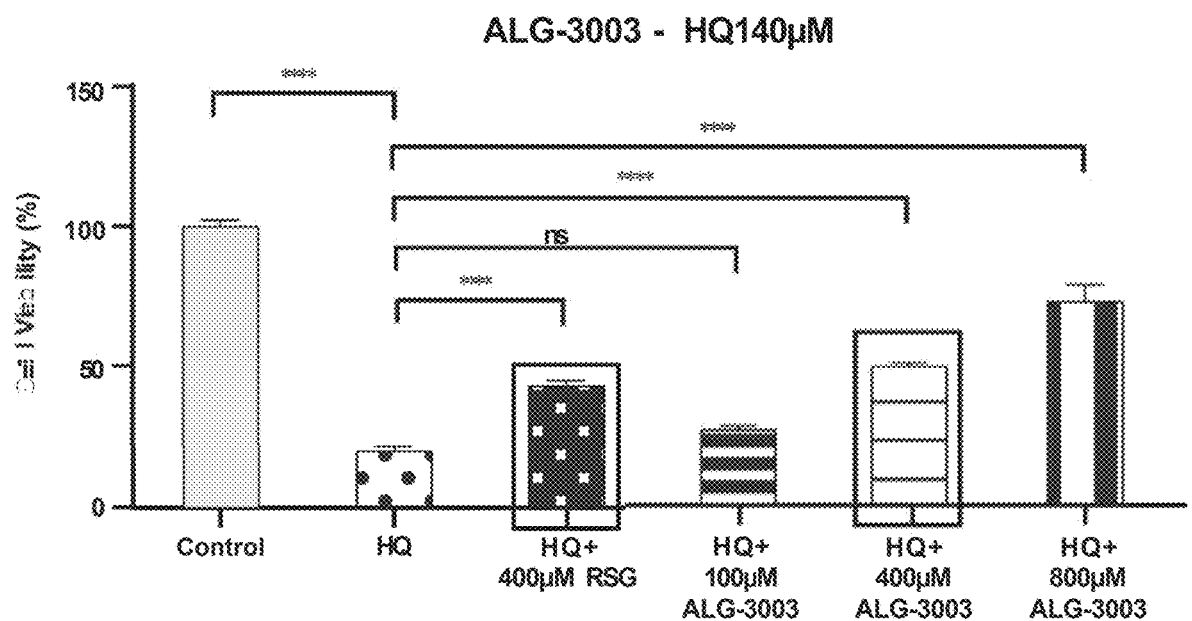
FIG. 3B is a bar graph comparing the effects of Control (SF-MEM), 140 μM Hydroquinone (HQ) alone, and 140 μM Hydroquinone (HQ) in combination with each of: 400 μM Risuteganib (RSG), 100 μM ALG-3003 (P3), 400 μM ALG-3003 (P3) and 800 μM ALG-3003 (P3). Statistical significance or non-significance is denoted as follows: (N.S.=not significant, * P≤0.05,  P≤0.01, * P≤0.001, and **** P≤0.0001)
Figure 3C:
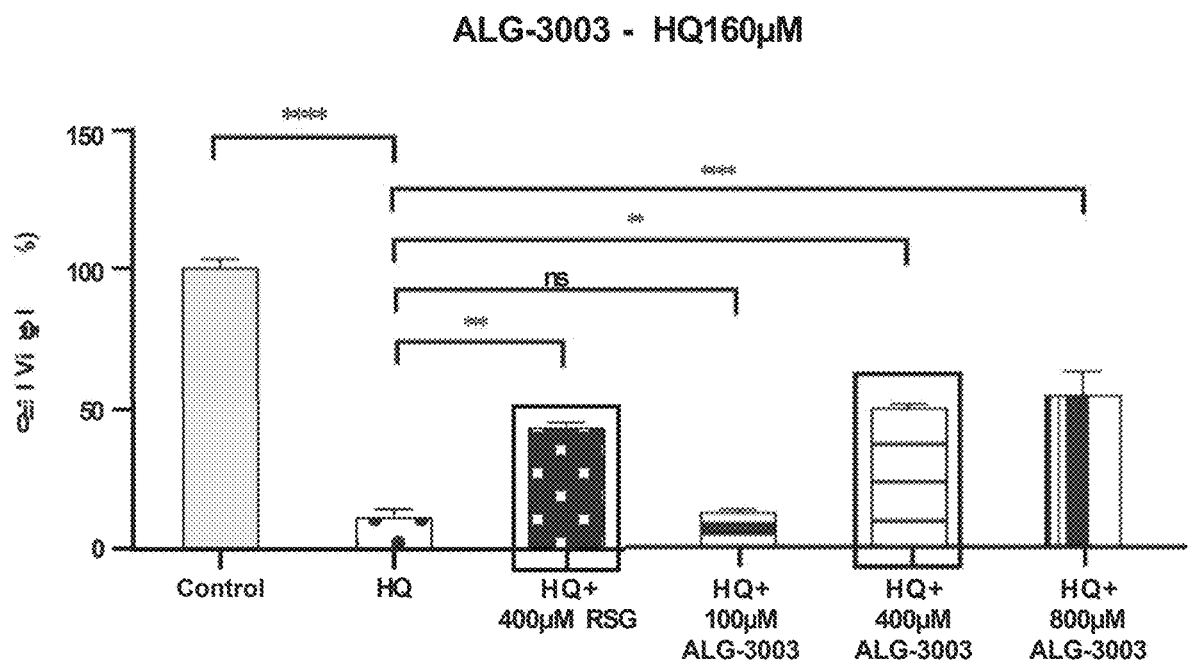
FIG. 3C is a bar graph comparing the effects of Control (SF-MEM), 160 μM Hydroquinone (HQ) alone, and 160 μM Hydroquinone (HQ) in combination with each of: 400 μM Risuteganib (RSG), 100 μM ALG-3003 (P3), 400 μM ALG-3003 (P3) and 800 μM ALG-3003 (P3). Statistical significance or non-significance is denoted as follows: (N.S.=not significant, * P≤0.05,  P≤0.01, * P≤0.001, and **** P≤0.0001).
Figure 4A:
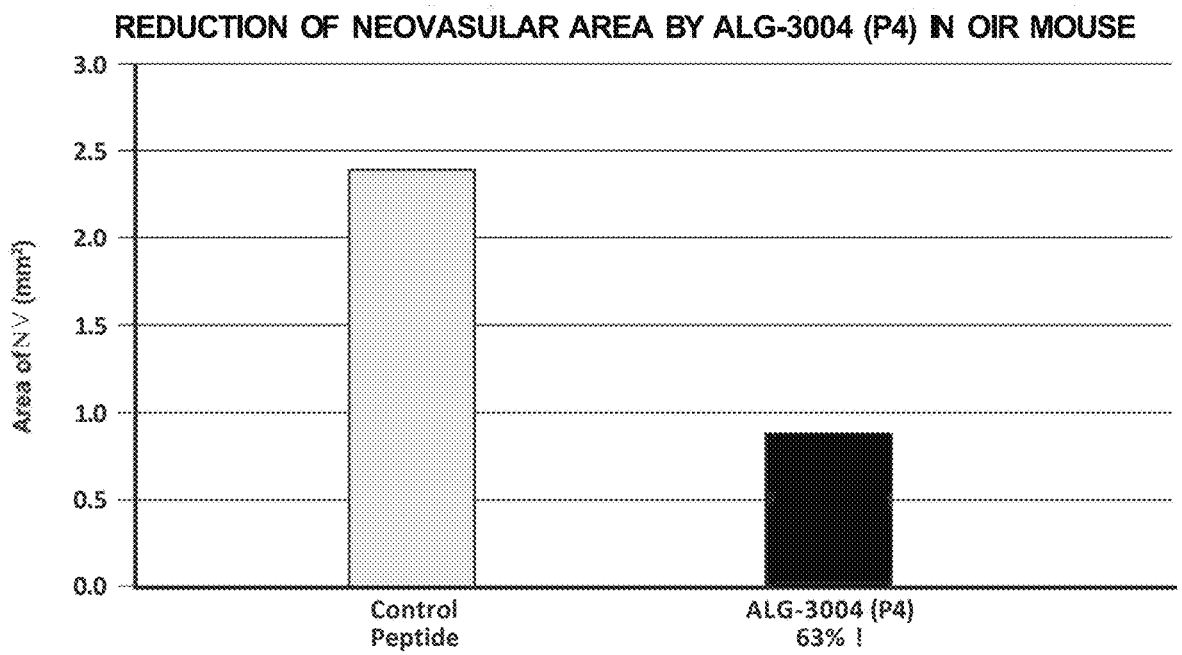
FIG. 4A is a bar graph comparing the effects of GRGETP (SEQ ID NO: 12) (Control Peptide) and ALG-3004 (P4) on retinal neovascularization in OIR mice.
Figure 4B:
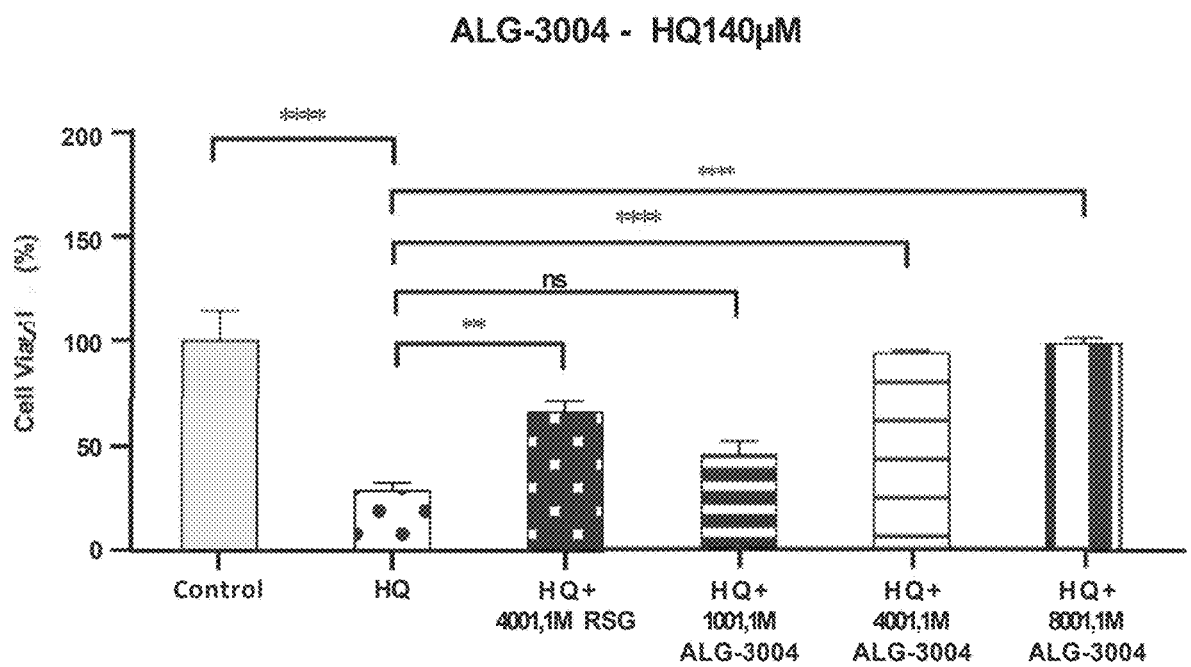
FIG. 4B is a bar graph comparing the effects of Control (SF-MEM), 140 μM Hydroquinone (HQ) alone, and 140 μM Hydroquinone (HQ) in combination with each of: 400 μM Risuteganib (RSG), 100 μM ALG-3004 (P4), 400 μM ALG-3004 (P4) and 800 μM ALG-3004 (P4). Statistical significance or non-significance is denoted as follows: (N.S.=not significant, * P≤0.05,  P≤0.01, * P≤0.001, and **** P≤0.0001).
Figure 4C:
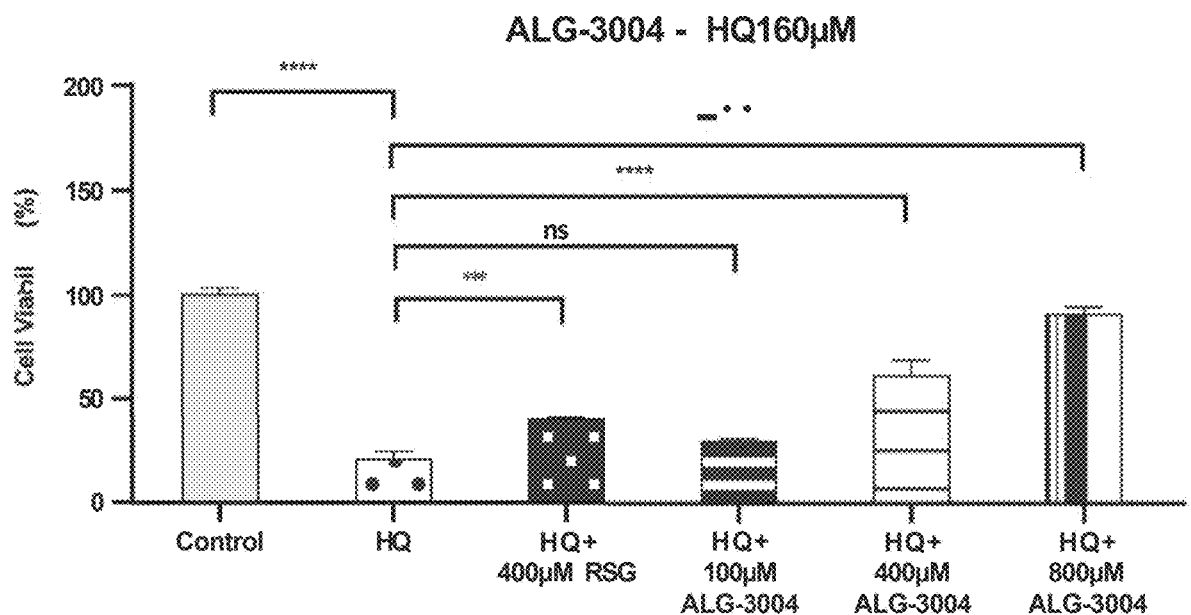
FIG. 4C is a bar graph comparing the effects of Control (SF-MEM), 160 μM Hydroquinone (HQ) alone, and 160 μM Hydroquinone (HQ) in combination with each of: 400 μM Risuteganib (RSG), 100 μM ALG-3004 (P4), 400 μM ALG-3004 (P4) and 800 μM ALG-3004 (P4). Statistical significance or non-significance is denoted as follows: (N.S.=not significant, * P≤0.05,  P≤0.01, * P≤0.001, and **** P≤0.0001).
Figure 5A:
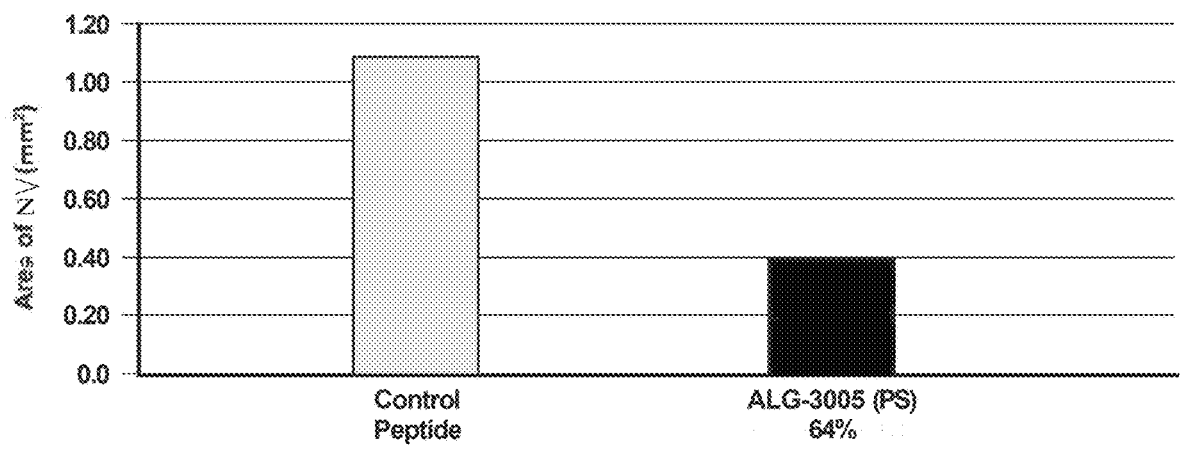
FIG. 5A is a bar graph comparing the effects of GRGETP (SEQ ID NO: 12) (Control Peptide) and ALG-3005 (P5) on retinal neovascularization in OIR mice.
Figure 5B:
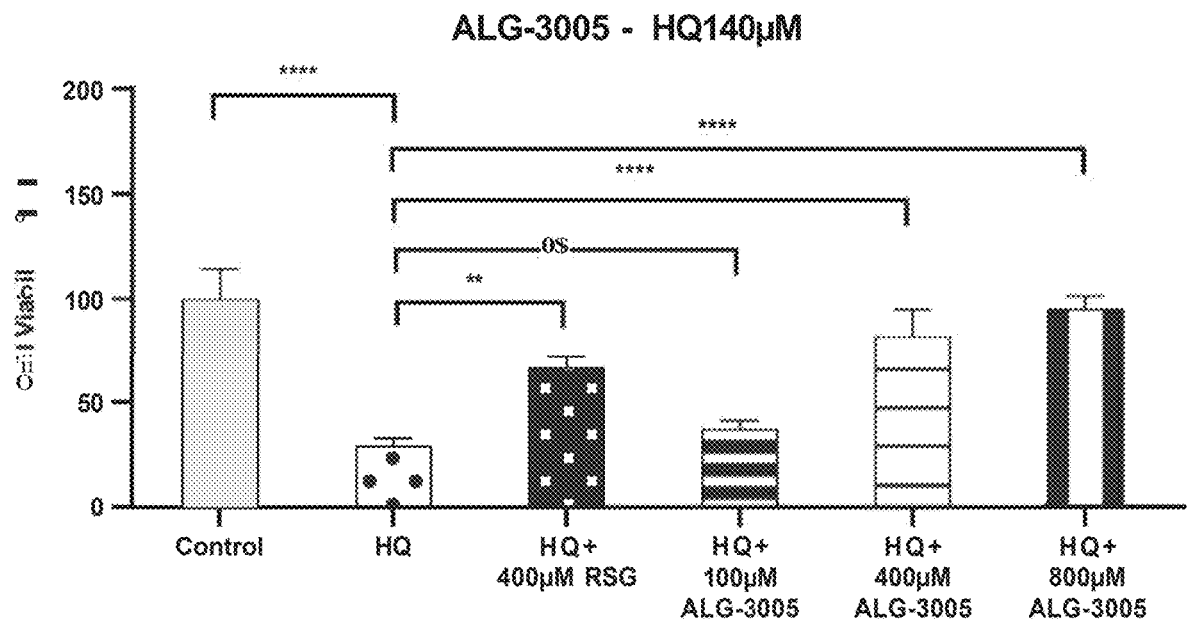
FIG. 5B is a bar graph comparing the effects of Control (SF-MEM), 140 μM Hydroquinone (HQ) alone, and 140 μM Hydroquinone (HQ) in combination with each of: 400 μM Risuteganib (RSG), 100 μM ALG-3005 (P5), 400 μM ALG-3005 (P5) and 800 μM ALG-3005 (P5). Statistical significance or non-significance is denoted as follows: (N.S.=not significant, * P≤0.05,  P≤0.01, * P≤0.001, and **** P≤0.0001).
Figure 5C:
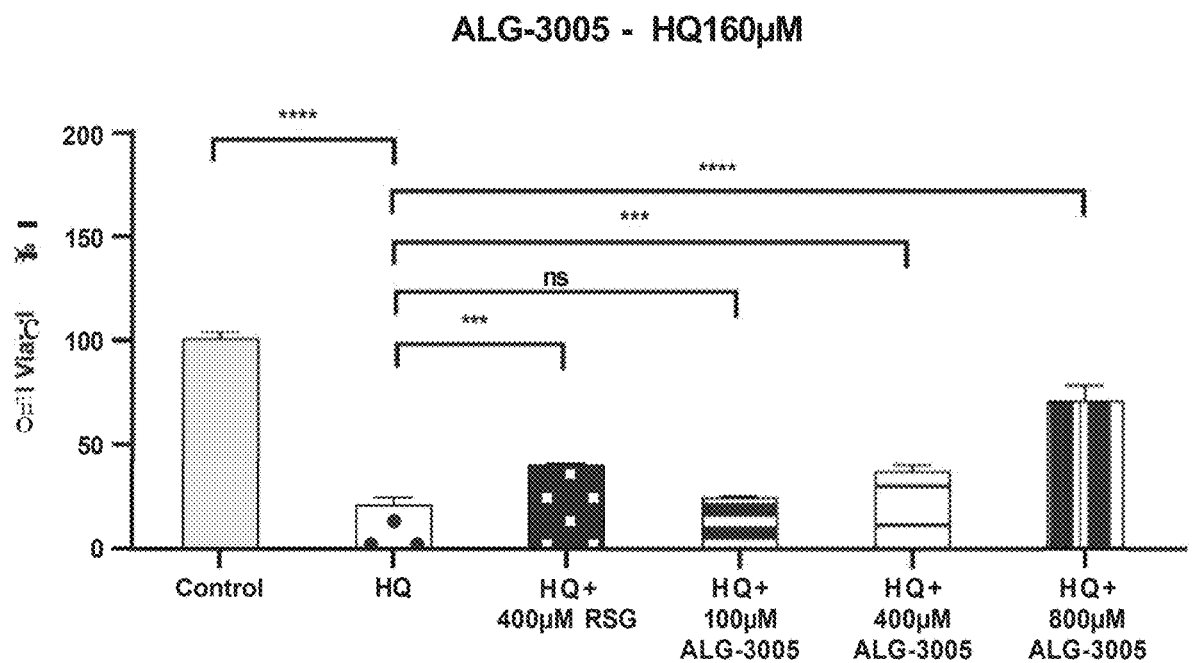
FIG. 5C is a bar graph comparing the effects of Control (SF-MEM), 160 μM Hydroquinone (HQ) alone, and 160 μM Hydroquinone (HQ) in combination with each of: 400 μM Risuteganib (RSG), 100 μM ALG-3005 (P5), 400 μM ALG-3005 (P5) and 800 μM ALG-3005 (P5). Statistical significance or non-significance is denoted as follows: (N.S.=not significant, * P≤0.05,  P≤0.01, * P≤0.001, and **** P≤0.0001).
Figure 6A:
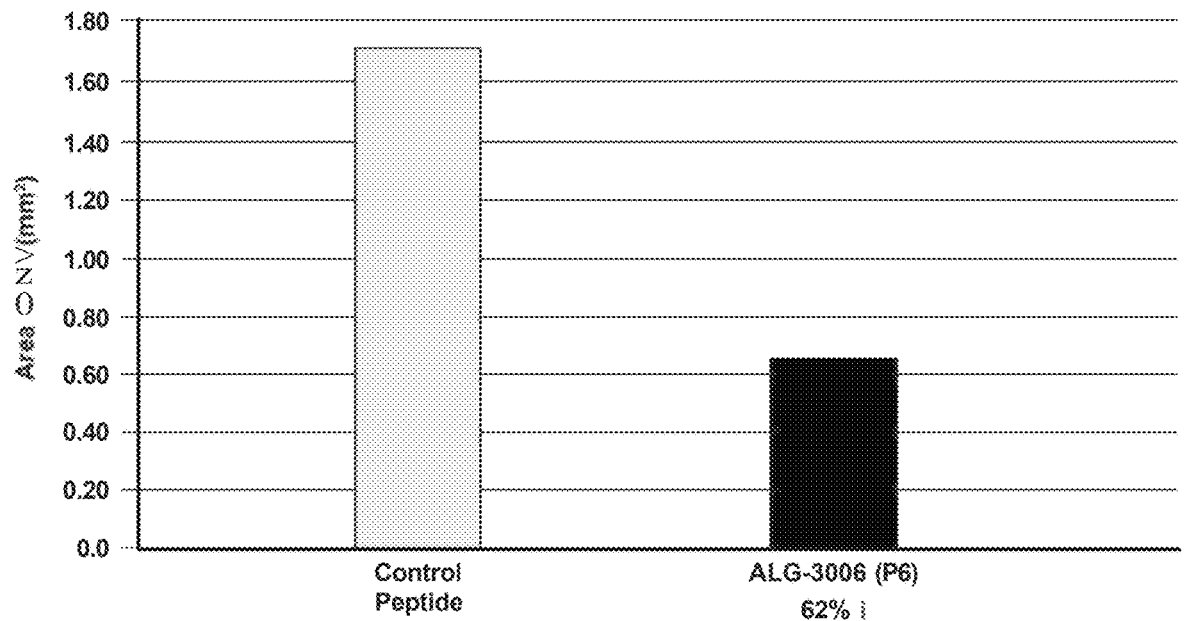
FIG. 6A is a bar graph comparing the effects of GRGETP (SEQ ID NO: 12) (Control Peptide) and ALG-3006 (P6) on retinal neovascularization in OIR mice.
Figure 6B:
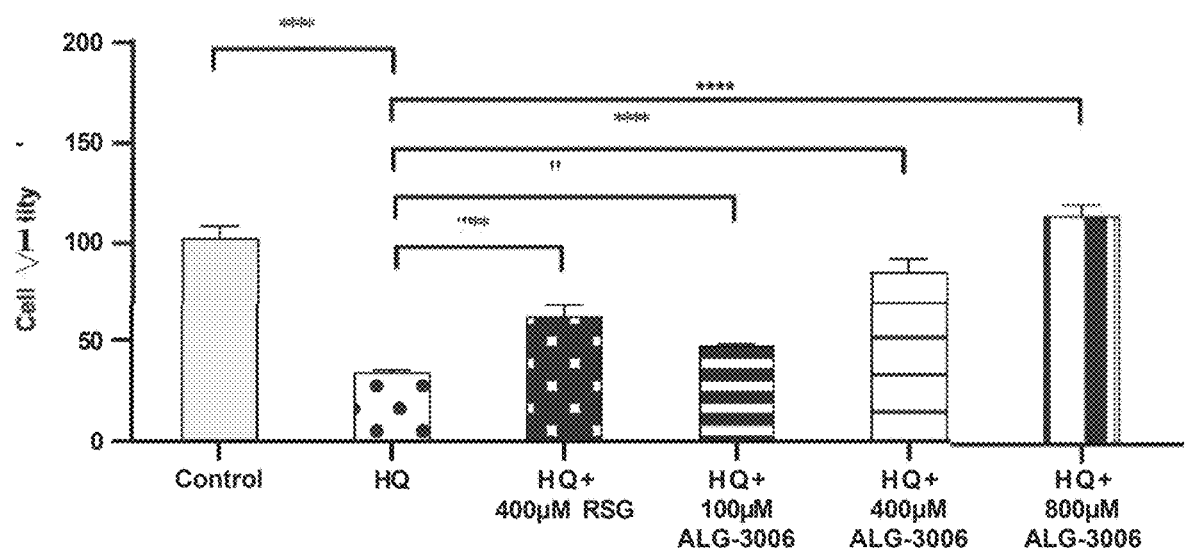
FIG. 6B is a bar graph comparing the effects of Control (SF-MEM), 140 μM Hydroquinone (HQ) alone, and 140 μM Hydroquinone (HQ) in combination with each of: 400 μM Risuteganib (RSG), 100 μM ALG-3006 (P6), 400 μM ALG-3006 (P6) and 800 μM ALG-3006 (P6). Statistical significance or non-significance is denoted as follows: (N.S.=not significant, * P≤0.05,  P≤0.01, * P≤0.001, and **** P≤0.0001).
Figure 6C:
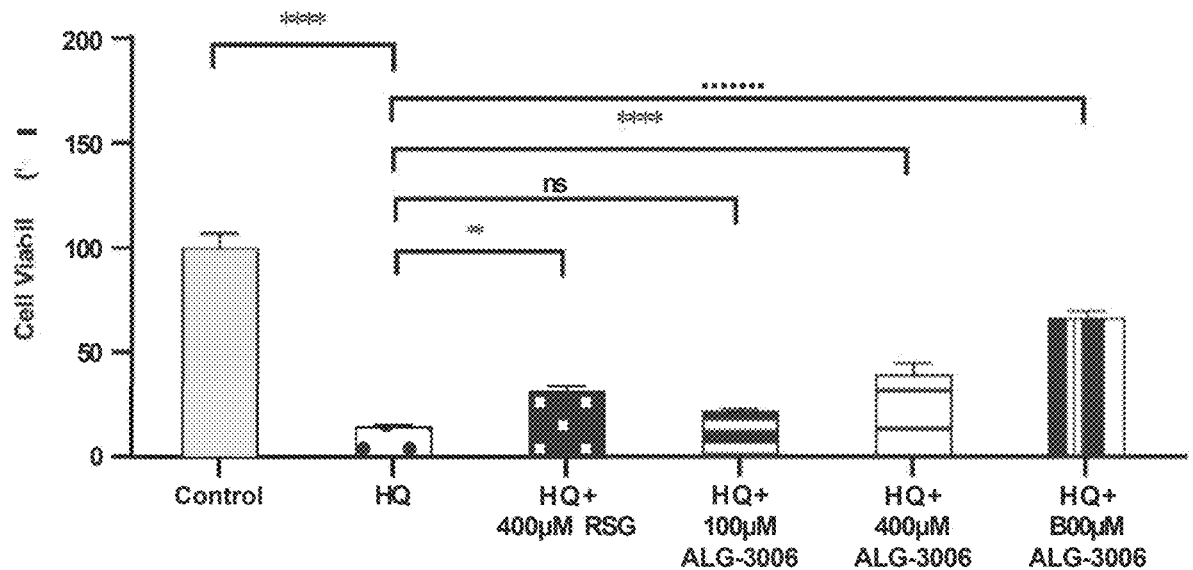
FIG. 6C is a bar graph comparing the effects of Control (SF-MEM), 160 μM Hydroquinone (HQ) alone, and 160 μM Hydroquinone (HQ) in combination with each of: 400 μM Risuteganib (RSG), 100 μM ALG-3006 (P6), 400 μM ALG-3006 (P6) and 800 μM ALG-3006 (P6). Statistical significance or non-significance is denoted as follows: (N.S.=not significant, * P≤0.05,  P≤0.01, * P≤0.001, and **** P≤0.0001).
Figure 7A:
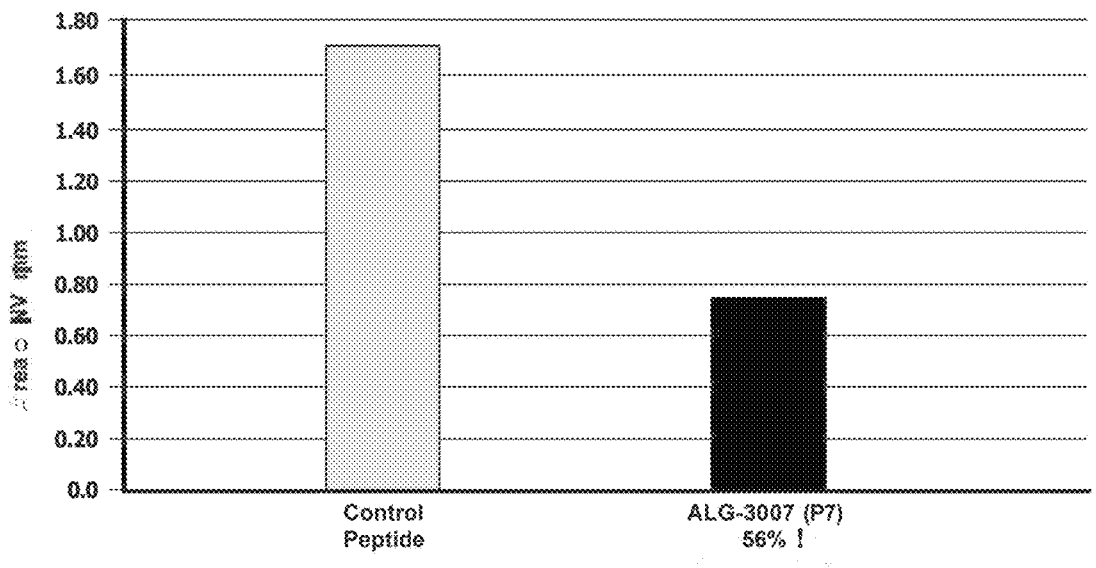
FIG. 7A is a bar graph comparing the effects of GRGETP (SEQ ID NO: 12) (Control Peptide) and ALG-3007 (P7) on retinal neovascularization in OIR mice.
Figure 7B:
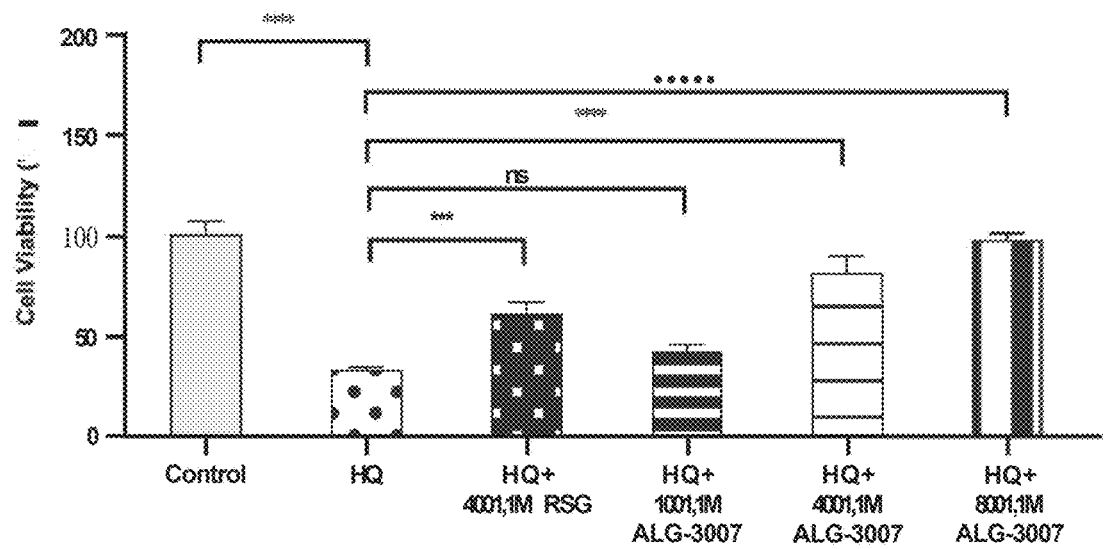
FIG. 7B is a bar graph comparing the effects of Control (SF-MEM), 140 μM Hydroquinone (HQ) alone, and 140 μM Hydroquinone (HQ) in combination with each of: 400 μM Risuteganib (RSG), 100 μM ALG-3007 (P7), 400 μM ALG-3007 (P7) and 800 μM ALG-3007 (P7). Statistical significance or non-significance is denoted as follows: (N.S.=not significant, * P≤0.05,  P≤0.01, * P≤0.001, and **** P≤0.0001).
Figure 7C:
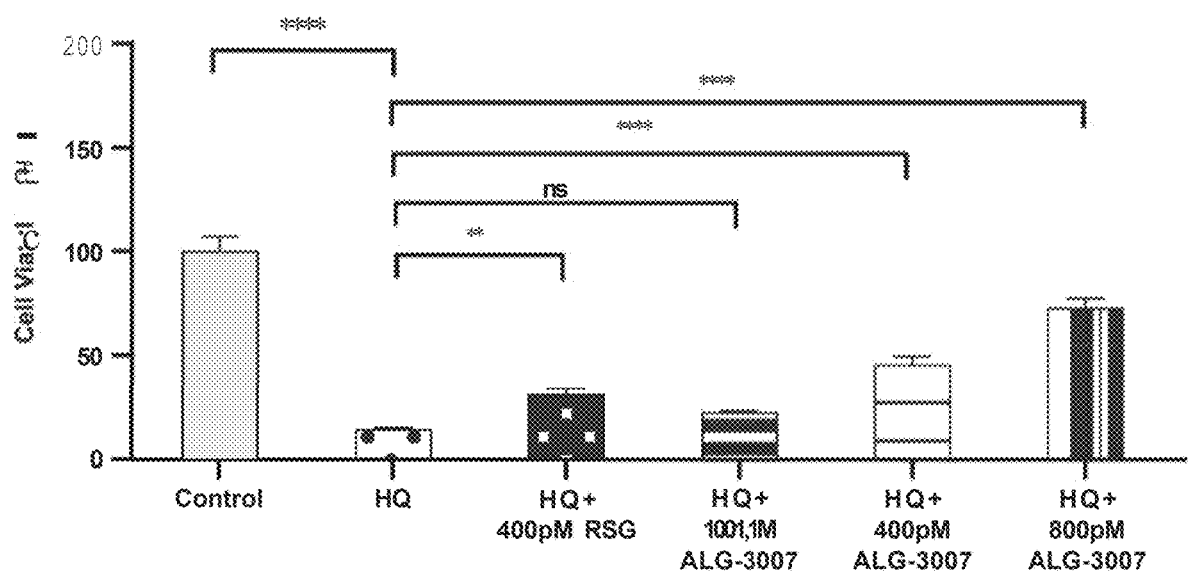
FIG. 7C is a bar graph comparing the effects of Control (SF-MEM), 160 μM Hydroquinone (HQ) alone, and 160 μM Hydroquinone (HQ) in combination with each of: 400 μM Risuteganib (RSG), 100 μM ALG-3007 (P7), 400 μM ALG-3007 (P7) and 800 μM ALG-3007 (P7). Statistical significance or non-significance is denoted as follows: (N.S.=not significant, * P≤0.05,  P≤0.01, * P≤0.001, and **** P≤0.0001).
Figure 8A:
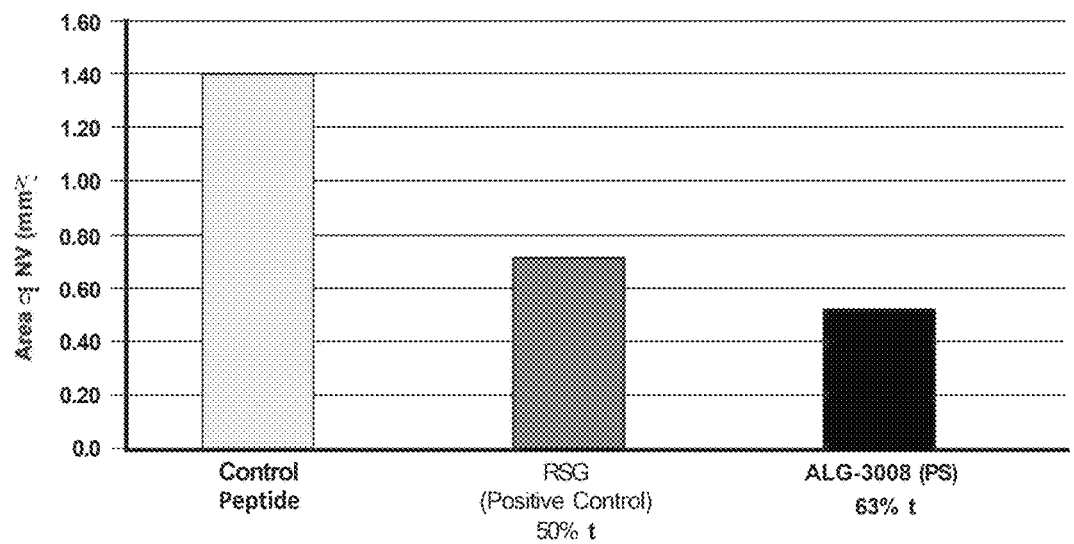
FIG. 8A is a bar graph comparing the effects of GRGETP (SEQ ID NO: 12) (Control Peptide), Risuteganib (RSG) (Positive Control) and ALG-3008 (P8) on retinal neovascularization in OIR mice.
Figure 8B:
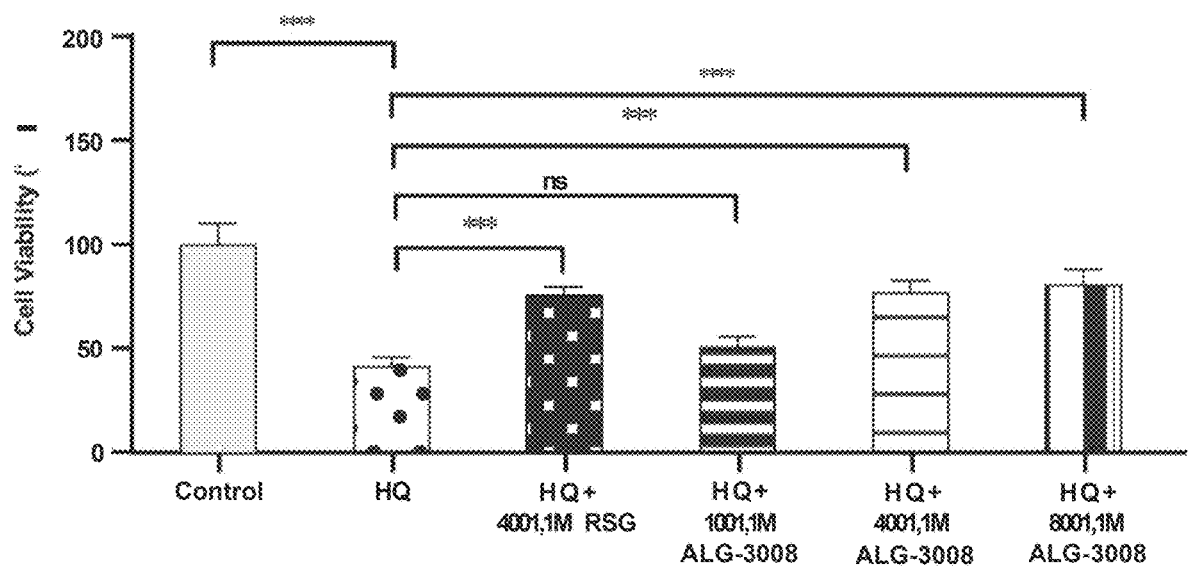
FIG. 8B is a bar graph comparing the effects of Control (SF-MEM), 140 μM Hydroquinone (HQ) alone, and 140 μM Hydroquinone (HQ) in combination with each of: 400 μM Risuteganib (RSG), 100 μM ALG-3008 (P8), 400 μM ALG-3008 (P8) and 800 μM ALG-3008 (P8). Statistical significance or non-significance is denoted as follows: (N.S.=not significant, * P≤0.05,  P≤0.01, * P≤0.001, and **** P≤0.0001).
Figure 8C:
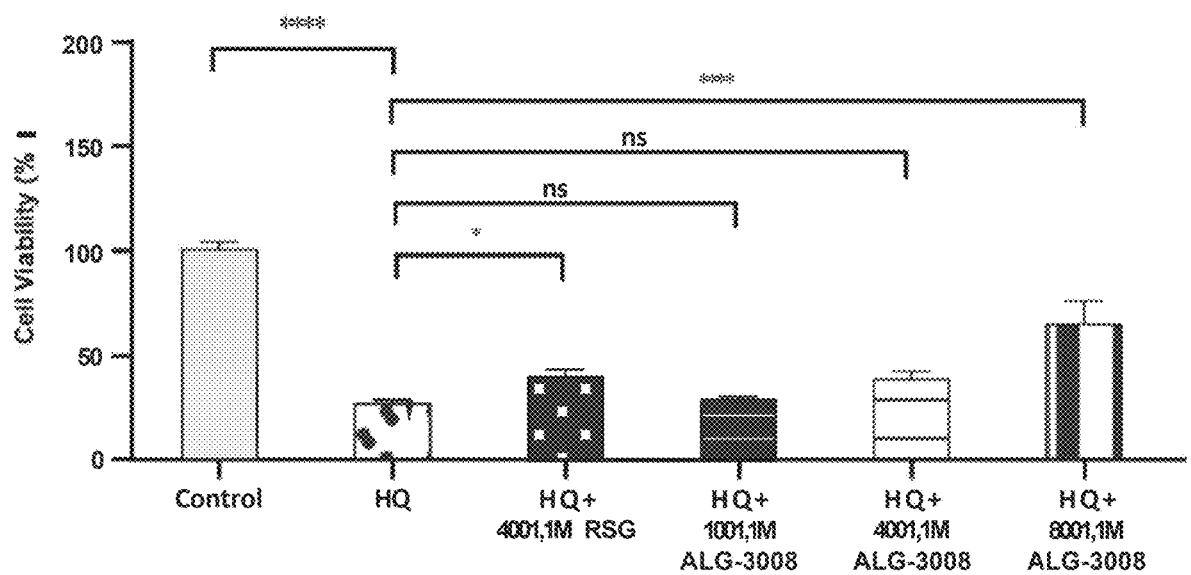
FIG. 8C is a bar graph comparing the effects of Control (SF-MEM), 160 μM Hydroquinone (HQ) alone, and 160 μM Hydroquinone (HQ) in combination with each of: 400 μM Risuteganib (RSG), 100 μM ALG-3008 (P8), 400 μM ALG-3008 (P8) and 800 μM ALG-3008 (P8). Statistical significance or non-significance is denoted as follows: (N.S.=not significant, * P≤0.05,  P≤0.01, * P≤0.001, and **** P≤0.0001).
Figure 9A:
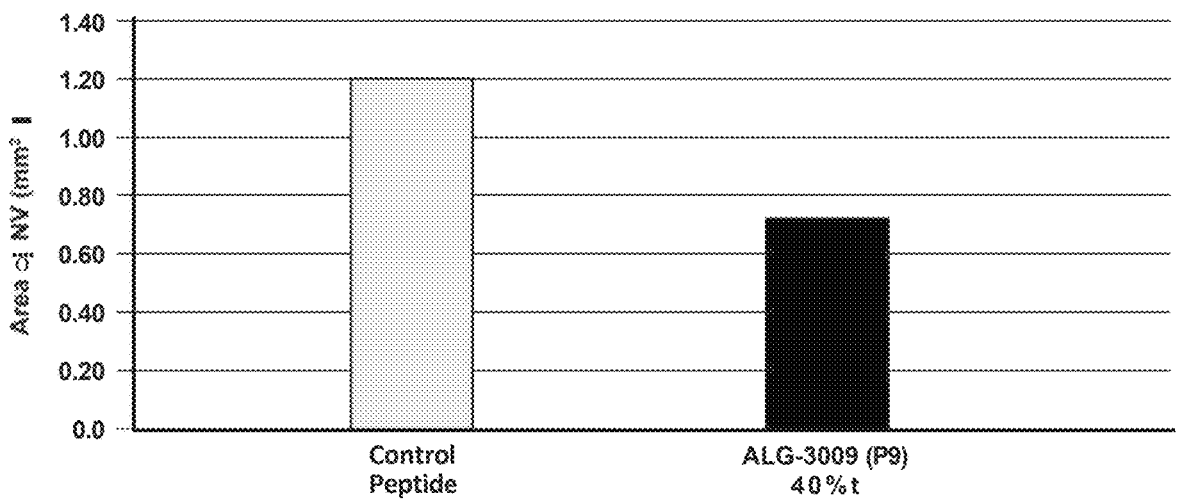
FIG. 9A is a bar graph comparing the effects of GRGETP (SEQ ID NO: 12) (Control Peptide) and ALG-3009 (P9) on retinal neovascularization in OIR mice.
Figure 9B:
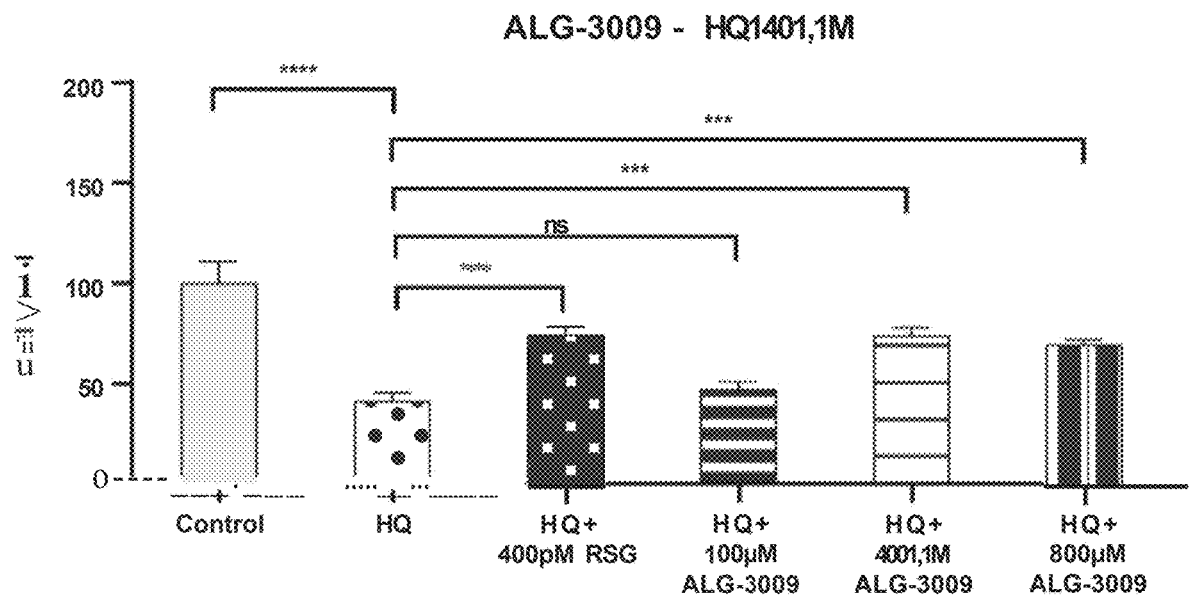
FIG. 9B is a bar graph comparing the effects of Control (SF-MEM), 140 μM Hydroquinone (HQ) alone, and 140 μM Hydroquinone (HQ) in combination with each of: 400 μM Risuteganib (RSG), 100 μM ALG-3009 (P9), 400 μM ALG-3009 (P9) and 800 μM ALG-3009 (P9). Statistical significance or non-significance is denoted as follows: (N.S.=not significant, * P≤0.05,  P≤0.01, * P≤0.001, and **** P≤0.0001).
Figure 9C:
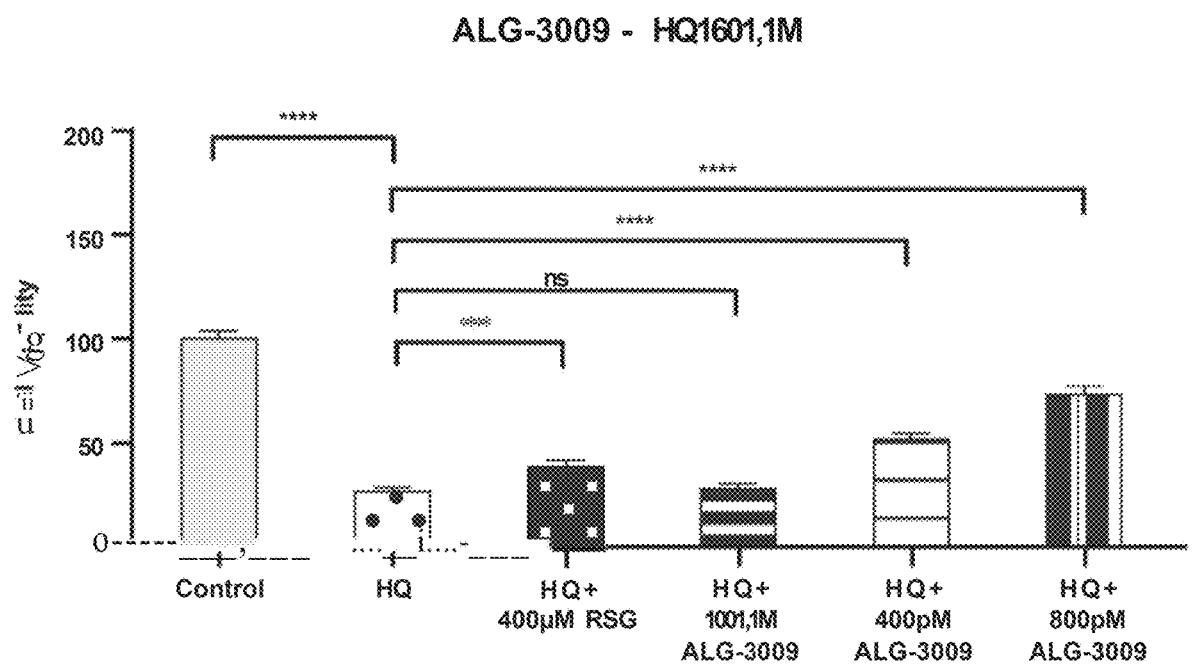
FIG. 9C is a bar graph comparing the effects of Control (SF-MEM), 160 µM Hydroquinone (HQ) alone, and 160 µM Hydroquinone (HQ) in combination with each of: 400 µM Risuteganib (RSG), 100 µM ALG-3009 (P9), 400 µM ALG-3009 (P9) and 800 µM ALG-3009 (P9). Statistical significance or non-significance is denoted as follows: (N.S.=not significant, * P≤0.05,  P≤0.01, * P≤0.001, and **** P≤0.0001).

These results are also summarized graphically in the following figures: FIGS. 1C and 1D—ALG-3001 (P1); FIGS. 2A, 2B, 2C and 2D—ALG-3002 (P2); FIGS. 3A and 3B—ALG-3003 (P3)); FIGS. 4A and 4B—ALG-3004 (P4); FIGS. 5A and 5B—(ALG-3005 (P5); FIGS. 6A and 6B—(ALG-3006 (P6); FIGS. 7A and 7B—ALG-3007 (P7); FIGS. 8A and 8B—(ALG-3008 (P8); and FIGS. 9A and 9B—ALG-3009 (P9).

Figure 10:
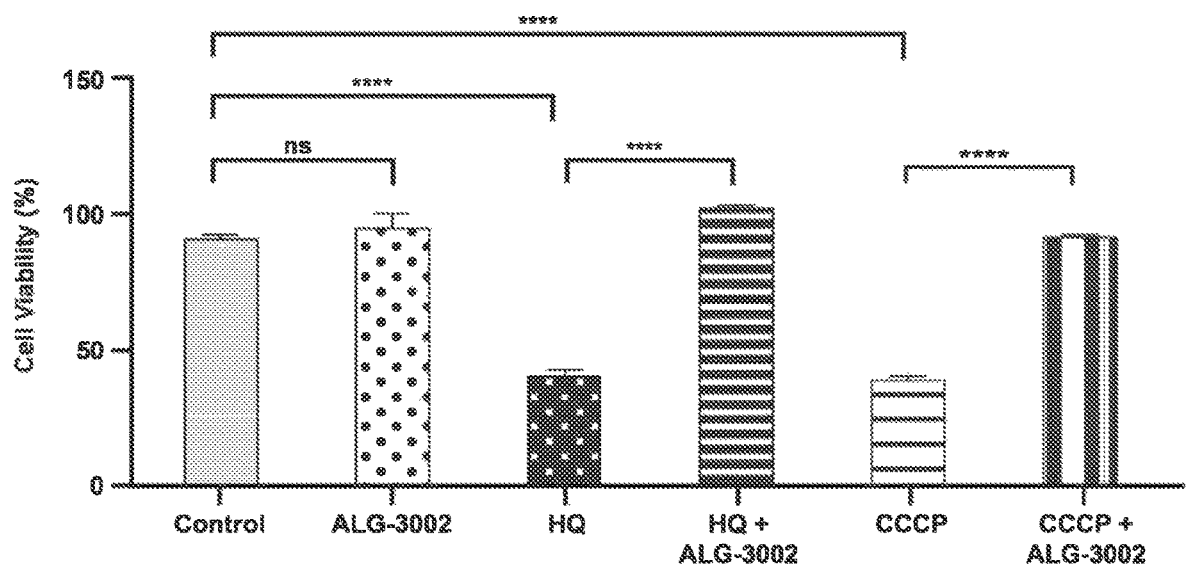
FIG. 10 is a bar graph showing the effects of ALG-3002 (P2) on cell viability in: normal (unstressed) retinal pigment epithelium (RPE) cells, Hydroquinone (HQ)-stressed retinal pigment epithelium (RPE) cells, and carbonyl cyanide phenylhydrazone (CCCP)-stressed retinal pigment epithelium (RPE) cells. Statistical significance or non-significance is denoted as follows: (N.S.=not significant, * P≤0.05,  P≤0.01, * P≤0.001, and **** P≤0.0001).

It was additionally determined that ALG-3002 (P2) was not only protective against HQ-induced stress but also against COOP-induced stress. Table 7 (below) and FIG. 10 compare the effects of 100 uM ALG 3002 (P2) in RIPE cells stressed with either COOP or HO. ALG-3002 (P2) was cytoprotective in both COOP-stressed cells and HQ-stressed cells.

TABLE 7

ALG-3002 RPE Cell Viability Against HQ and CCCP Stress in RPE Cells

| P2 VS Control | | HQ VS Control | HQ VS P2 HQ + ALG-3002 (P2) | CCCP VS Control | CCCP VS P2 CCCP + ALG-3002 |
|---|---|---|---|---|---|
| Control | ALG-3002 (P2) | | | | |
| 91% | 94% NS | 38%**** | 103%**** | 41%**** | 88%**** |

NS = not significant,
*P ≤ 0.05,
**P ≤ 0.01,
***P ≤ 0.001, and
****P ≤ 0.0001
In cells exposed to HQ or CCCP alone Cell Viability is 41%.
HQ + 400 µM ALG-3002 (P2) Cell Viability is 103%.
CCCP + 400 µM of ALG-3002 (P2) Cell Viability is 88%.

RPE cell degeneration is central to the pathogenesis of age-related macular degeneration (AMD), a disease that leads to progressive loss of visual function and blindness. Risuteganib, along with these nine new peptides showed an in vitro signal indicating they can preserve RPE cell viability, reduce ROS level and improve mitochondria integrity in human RPE cells stressed by an oxidant associated with macular degeneration. These peptides could be beneficial in the treatment of AMD and other degenerative eye diseases.

All nine of the Test Compounds protected cell viability, with ALG-3004 (P4), ALG-3006 (P6) and ALG-3007 (P7) providing a greater cytoprotective effect than RSG (positive control). Of the nine Test Compounds, ALG-3002 (P2) showed the greatest cytoprotective effect in this study, which appears to be dose related.

Reactive Oxygen Species (ROS)

Figure 11:
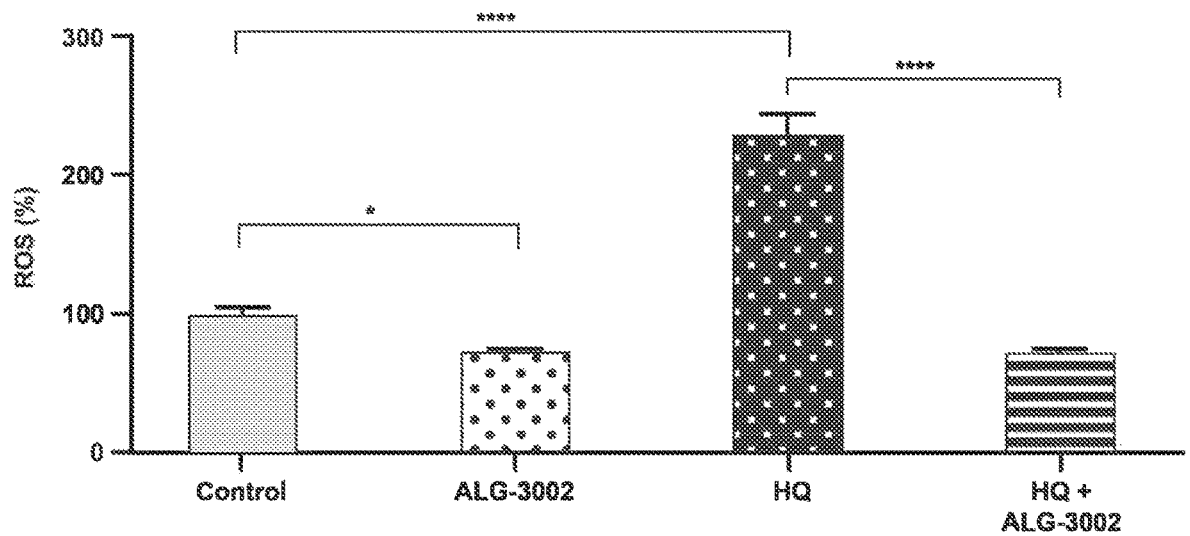
FIG. 11 is a bar graph showing the effects of ALG-3002 (P2) on Reactive Oxygen Species (ROS) in: normal (unstressed) retinal pigment epithelium (RPE) cells and Hydroquinone (HQ)-stressed retinal pigment epithelium (RPE) cells. Statistical significance or non-significance is denoted as follows: (N.S.=not significant, * P≤0.05,  P≤0.01, * P≤0.001, and **** P≤0.0001).
Figure 12:
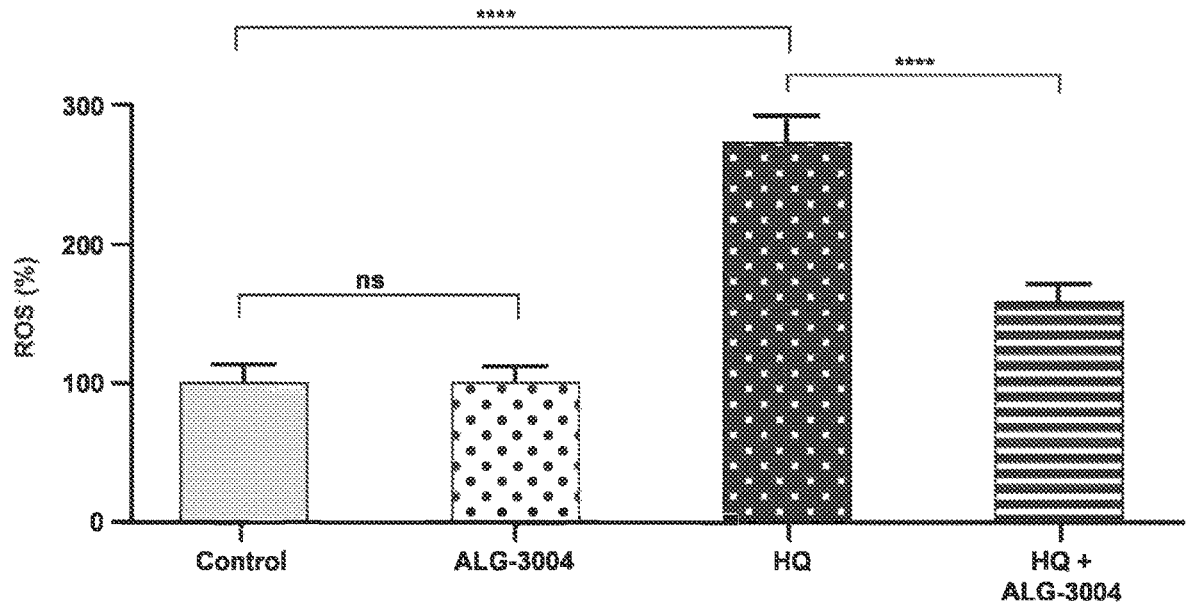
FIG. 12 is a bar graph showing the effects of ALG-3004 (P4) on Reactive Oxygen Species (ROS) in: normal (unstressed) retinal pigment epithelium (RPE) cells and Hydroquinone (HQ)-stressed retinal pigment epithelium (RPE) cells. Statistical significance or non-significance is denoted as follows: (N.S.=not significant, * P≤0.05,  P≤0.01, * P≤0.001, and **** P≤0.0001).
Figure 13:
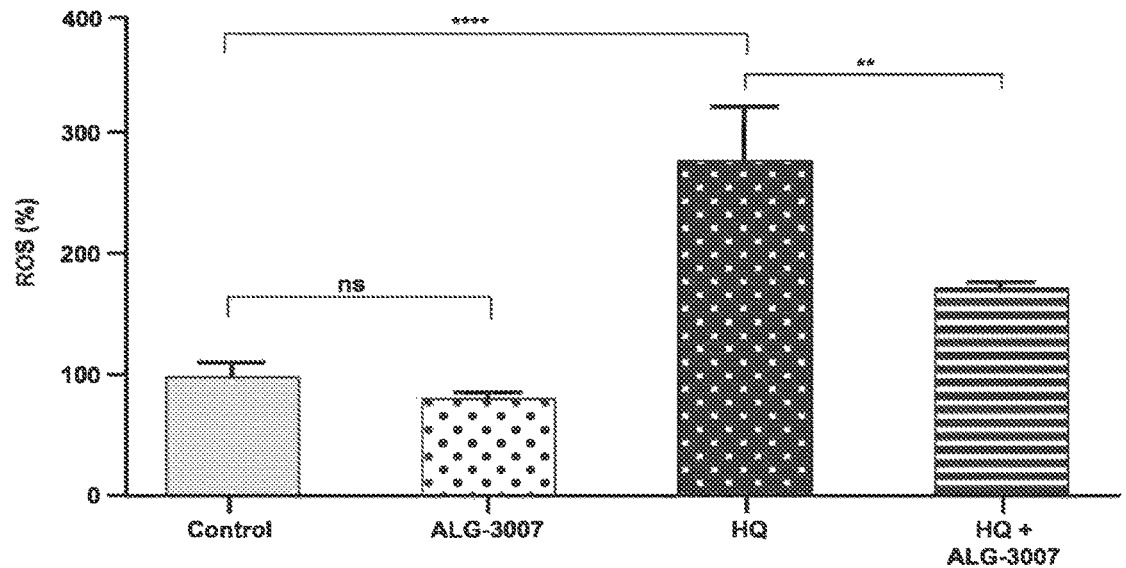
FIG. 13 is a bar graph showing the effects of ALG-3007 (P7) on Reactive Oxygen Species (ROS) in: normal (unstressed) retinal pigment epithelium (RPE) cells and Hydroquinone (HQ)-stressed retinal pigment epithelium (RPE) cells. Statistical significance or non-significance is denoted as follows: (N.S.=not significant, * P≤0.05,  P≤0.01, * P≤0.001, and **** P≤0.0001).

ROS level is a measure of oxidative stress experienced by cells. CM-H2DCFDA-based ROS assay was used to measure the level of ROS after treatments. ALG-3002 (P2), ALG-3004 (P4) and ALG-3007 (P7) were tested and all three were found to significantly reduce ROS level in retinal pigment epithelium (RPE) co-treated with carbonyl cyanide phenylhydrazone (CCCP) or -stressed retinal pigment epithelium (RPE) cells HQ, as plotted, and summarized in Table 8 (below) and shown graphically in FIG. 11 (ALG-3002 (P2)), FIG. 12 (ALG-3004(P4)) and FIG. 13 (ALG-3007(P7)).

TABLE 8

Reduction of Reactive Oxygen Species in HQ Stress RPE Cells Exposed to ALG-3002, ALG-3004, and ALG-3007

| % Reactive Species in HQ Stressed RPE cells Treated with ALG-3002 | | | |
|---|---|---|---|
| HQ VS Control | | Control VS P2 | HQ VS HQ + P2 |
| Control | HQ-140 µM | ALG-3002(P2)-100 µM | HQ-140 µM + ALG-3002(P2)-100 µM |
| 100% | 230%**** | 73%* | 73%**** |
| % Reactive Species in HQ Stressed RPE cells Treated with ALG-3004 | | | |
| HQ VS Control | | Control VS P4 | HQ VS HQ + P4 |
| Control | HQ-140 µM | ALG-3004(P4)-400 µM | HQ-140 µM + ALG-30049P4)-400 µM |
| 100% | 271%**** | 100% NS | 158%**** |
| % Reactive Species in HQ Stressed RPE cells Treated with ALG-3007 | | | |
| HQ VS Control | | Control VS P7 | HQ VS HQ + P7 |
| Control | HQ-140 µM | ALG-3007(7)-400 µM | HQ-140 µM + ALG-3007(P7)-400 µM |
| 100% | 282%**** | 82% NS | 175%** |

NS = not significant,
*P ≤ 0.05,
**P ≤ 0.01,
***P ≤ 0.001, and
****P ≤ 0.0001
Reactive oxygen species were increased by HQ to 230% while HQ + ALG-3002 decreased the reactive oxygen species to 73%.
Reactive oxygen species were increased by HQ to 271% while HQ + ALG-3004 decreased the reactive oxygen species to 152%.
Reactive oxygen species were increased by HQ to 282% while HQ + ALG-3007 decreased the reactive oxygen species to 175%.

Mitochondrial Membrane Potential

Figure 14:
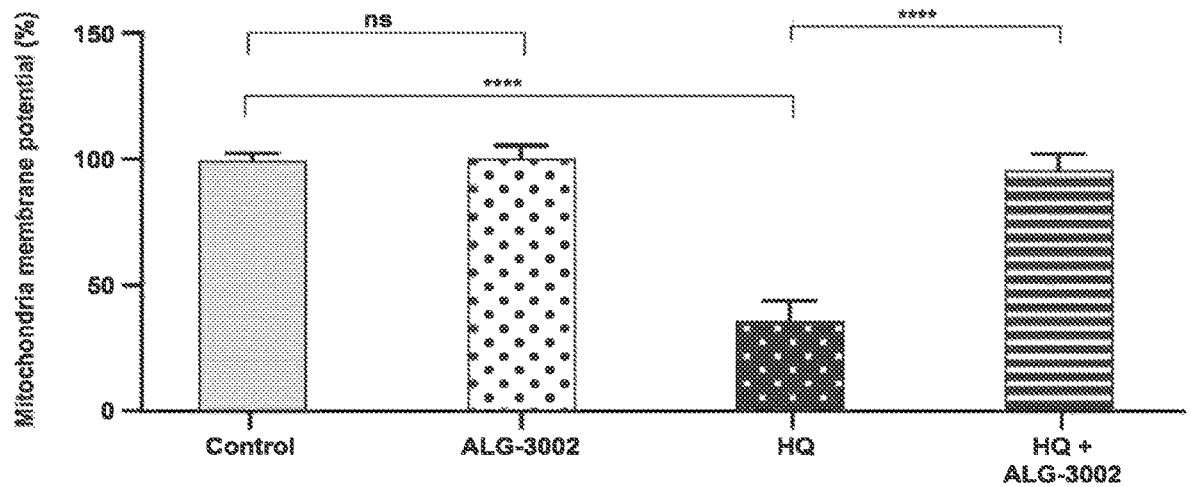
FIG. 14 is a bar graph showing the effects of ALG-3002 (P2) on Mitochondrial Membrane Potential (MMP) in: normal (unstressed) retinal pigment epithelium (RPE) cells and Hydroquinone (HQ)-stressed retinal pigment epithelium (RPE) cells. Statistical significance or non-significance is denoted as follows: (N.S.=not significant, * P≤0.05,  P≤0.01, * P≤0.001, and **** P≤0.0001).
Figure 15:
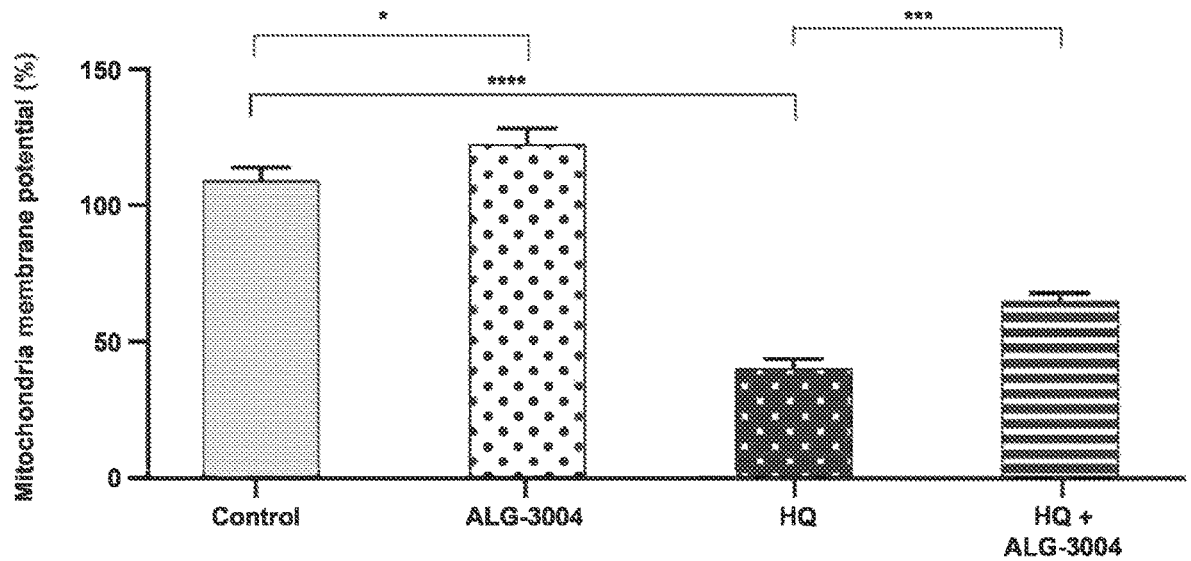
FIG. 15 is a bar graph showing the effects of ALG-3004 (P4) on Mitochondrial Membrane Potential (MMP) in: normal (unstressed) retinal pigment epithelium (RPE) cells and Hydroquinone (HQ)-stressed retinal pigment epithelium (RPE) cells. Statistical significance or non-significance is denoted as follows: (N.S.=not significant, * P≤0.05,  Pos 0.01, * P≤0.001, and **** P≤0.0001).
Figure 16:
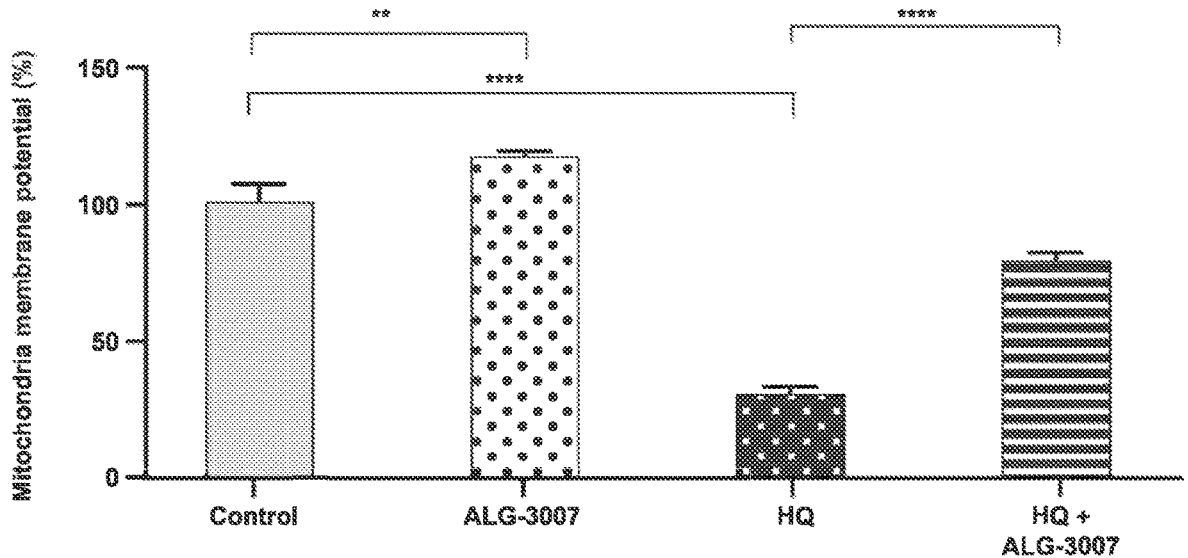
FIG. 16 is a bar graph showing the effects of ALG-3007 (P7) on Mitochondrial Membrane Potential (MMP) in: normal (unstressed) retinal pigment epithelium (RPE) cells and Hydroquinone (HQ)-stressed retinal pigment epithelium (RPE) cells. Statistical significance or non-significance is denoted as follows: (N.S.=not significant, * P≤0.05,  P≤s 0.01, * P≤0.001, and **** P≤0.0001).

Mitochondria membrane potential is an indicator of mitochondria integrity, where lower potential signifies deteriorated mitochondria and reduced cell health. ALG-3002, ALG-3004 and ALG-3007 were tested and all three were found to significantly improve mitochondria membrane potential in cells co-treated with HQ, as plotted and also summarized in Table 9 (below) and shown graphically in FIG. 14 (ALG-3002 (P2)), FIG. 15 (ALG-3004(P4)) and FIG. 16 (ALG-3007(P7)).

TABLE 9

Increase in Mitochondrial Membrane Potential of HQ stressed cells Exposed to ALG-3002 (P2), ALG-3004 (P4), and ALG-3007 (P7)

% Mitochondrial Membrane Potential by ALG-3002 on HQ Stressed RPE Cells Compared to Control

| Control VS HQ | | Control VS (P2) | HQ VS (P2) |
|---|---|---|---|
| Control | HQ-140 µM | ALG-3002 (P2)-100 µM | HQ-140 µM + ALG-3002(P2)-100 µM |
| 100% | 25%**** | 100% NS | 91%**** |

% in Mitochondrial Membrane Potential by ALG-3004 on HQ Stressed RPE Cells Compared to Control

| Control VS HQ | | Control VS (P4) | HQ VS (P4) |
|---|---|---|---|
| Control | HQ-140 µM | ALG-3004 (P4)-400 µM | HQ-140 µM + ALG-3004(P4)-400 µM |
| 106% | 47%**** | 110%* | 62%**** |

% Change in Mitochondrial Membrane Potential by ALG-3007 on HQ Stressed RPE Cells Compared to Control

| Control VS HQ | | Control VS (P7) | HQ VS (P7) |
|---|---|---|---|
| Control | HQ-140 µM | ALG-3007(P7)-400 µM | HQ-140 µM + ALG-3007(P7)-400 µM |
| 100% | 29%**** | 115%** | 79%**** |

NS = not significant,
*P ≤ 0.05,
**P ≤ 0.01,
***P ≤ 0.001, and
****P ≤ 0.0001

Mitochondrial Membrane potential was reduced by HQ to 25% while HQ + ALG-3002 increased the mitochondrial membrane potential to 91%.
Mitochondrial Membrane potential was reduced by HQ to 47% while HQ + ALG-3004 increased the mitochondrial membrane potential to 62%.
Mitochondrial Membrane potential was reduced by HQ to 29% while HQ + ALG-3007 increased the mitochondrial membrane potential to 79%.

Levels of Glutathione (GSH)

Figure 17:
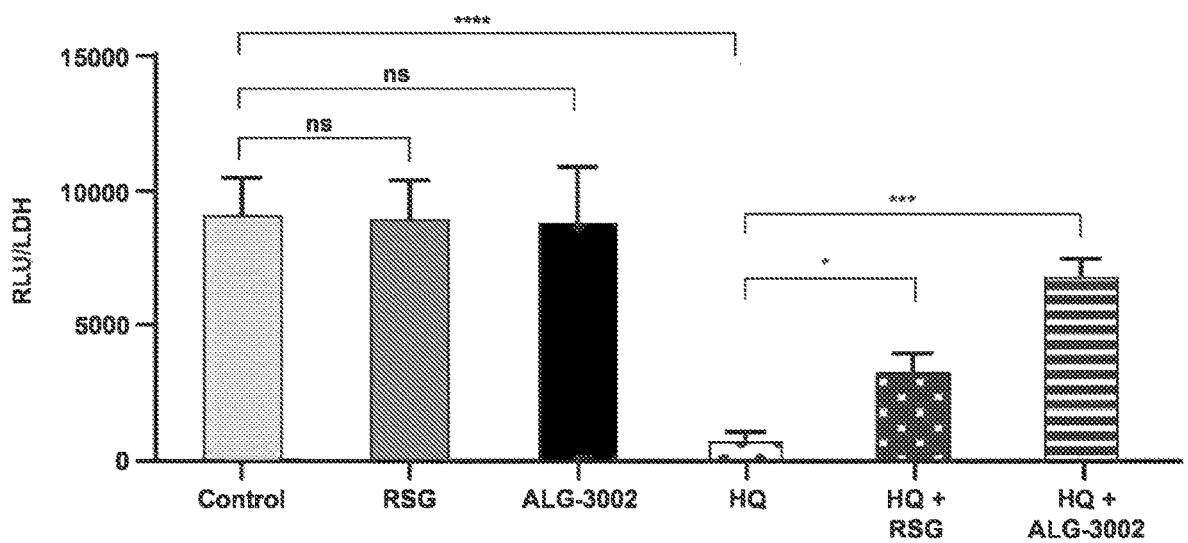
FIG. 17 is a bar graph comparing the effects of SF-MEM (Control), risuteganib (RSG) alone, ALG-3002 (P2) alone, hydroquinone (HQ) alone, hydroquinone (HQ)+risuteganib (RSG) and hydroquinone (HQ)+ALG-3002 (P2), on glutathione (GSH) concentration in retinal pigment epithelium (RPE) cells. Statistical significance or non-significance is denoted as follows: (N.S.=not significant, * P≤0.05,  P≤0.01, * P≤0.001, and **** P≤0.0001).

Glutathione (GSH) is a natural antioxidant that cells use to maintain redox homeostasis. GSH level was measured using GSH-Glo GSH assay after treatments. Cells stressed with HQ showed reduced GSH level, while both RSG and ALG-3002 significantly improved GSH level, as summarized in Table 10 (below) and shown graphically in FIG. 17.

TABLE 10

Increase in Glutathione (GSH) Antioxidant in HQ Stressed RPE Cells

| Control | 160 µm HQ | 400 µM RSG | 160 µM-HQ + 400 µM RSG | 400 µM ALG-3002 | 160 µM HQ + 400 µM-ALG-3002 |
|---|---|---|---|---|---|
| 8995↑ | 597↓ | 8995↑ | 3284↑ | 8657↑ | 8060↑ |

Conclusions:
The Untreated Control level of Glutathione (GSH) is 9064 RLU/LDH units.
The presence of 120 µM of HQ toxin reduces the level of Glutathione (GSH) to 597 RLU/LDH units.
The 800 µM RSG has no effect on the normal level of Glutathione (GSH) 8995 RLU/LDH units.
The presence of 120 µM of HQ + 800 µM RSG lowers the level of Glutathione (GSH) to 3248 RLU/LDH units.
The 100 µM ALG-3002 has no effect on the normal level of Glutathione (GSH) 8657 RLU/LDH units.
The presence of 120 µM of HQ + 100 µM ALG-3002 increases the level of Glutathione (GSH) to 8060 RLU/LDH units.

Effects of RSG and ALG-3002 on Mitochondrial Ultrastructure in Human RPE Cells

This study compared the effect of risuteganib (RSG) and ALG-3002 (P2) on the morphology of mitochondria in primary human RPE cells stressed with the cigarette smoke toxin, hydroquinone (HQ). HQ is known to induce oxidative stress in cells, leading to cytotoxicity.

Methods: Primary human RPE cells cultured in 6-well plate were treated with HQ (180 µM) in the presence or absence of RSG (800 µM) and ALG-3002 (100 µM) for 4 hours. After treatment, media was removed and cells then washed with warm PBS (2 mL/well). Cells were lifted by trypsin-EDTA (600 µL/well), followed by addition of PBS to dilute the trypsin (1 mL/well). Cells were pelleted and washed with PBS (1 mL/well), then fixed with 3% PFA and 2% glutaraldehyde in PBS for 18 hours at 4 degrees Celsius.

Cell pellets were then washed with 1 mL PBS and imaged under a transmission EM system for mitochondria ultrastructure changes by HQ and peptides.

Figure 18A:
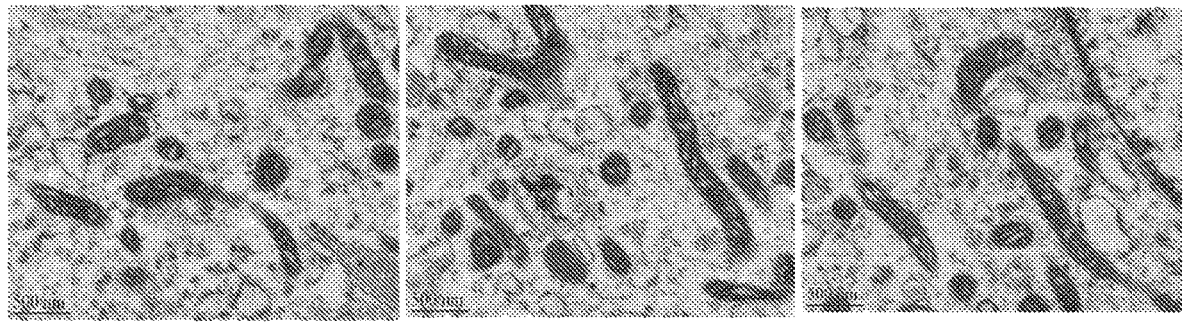
FIG. 18A shows micrographic images of mitochondrial morphology in normal MEM cultured retinal pigment epithelium (RPE) cells.
Figure 18B:
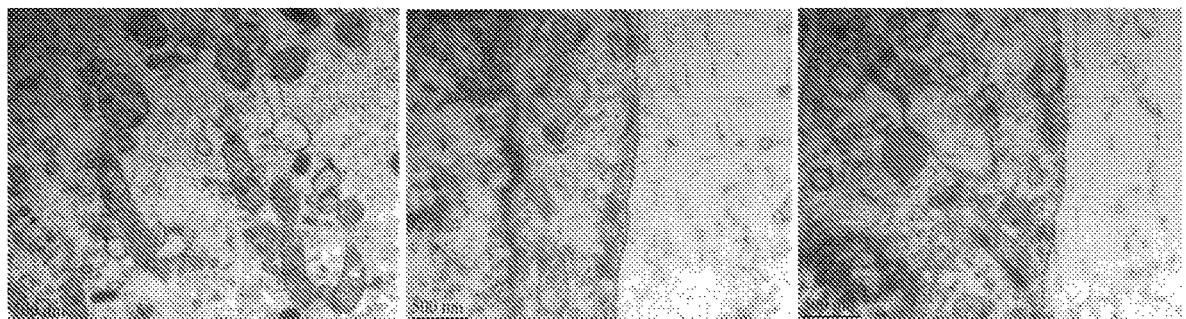
FIG. 18B shows micrographic images of mitochondrial morphology in hydroquinone (HQ)-stressed retinal pigment epithelium (RPE).
Figure 18C:
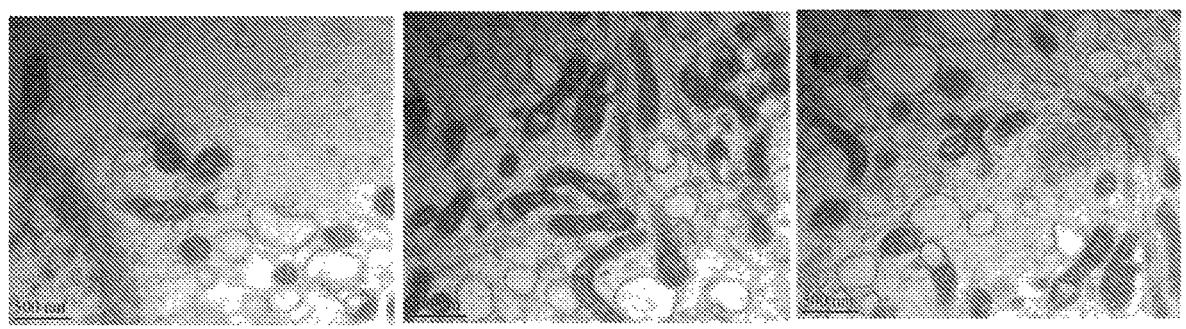
FIG. 18C shows micrographic images of mitochondrial morphology in hydroquinone (HQ)-stressed retinal pigment epithelium (RPE) cells that were treated with risuteganib (RSG).
Figure 18D:
FIG. 18D shows micrographic images of mitochondrial morphology in hydroquinone (HQ)-stressed retinal pigment epithelium (RPE) cells that were treated with ALG-3002 (P2).

Results/Discussion: FIGS. 18A through 18C are representative of micrographs showing that, in unstressed control cells (FIG. 25A) normal mitochondria morphology was observed, while exposure of the cells to HQ (FIG. 25B) caused alterations in mitochondrial morphology including mitochondrial swelling, presence of vacuoles, and loss of cristae. Both the positive control RSG (FIG. 25C) and the Test Compound ALG-3002 (P2) (FIG. 25D) appeared to significantly reduce the severity of HQ-induced morphologic changes in mitochondria.

Conclusions: In these primary human RPE cell cultures, RSG and ALG-3002 both protected mitochondria of RPE cells against morphologically apparent HQ stress.

Therapeutic Uses of ALG-3001-ALG-3009

Mitochondria, the intracellular organelles comprising the main respiratory machinery in cells, are crucial for energy production and cell homeostasis. Due to a high level of metabolic demand by photoreceptors, RPE cells are enriched with a large mitochondrial population to meet the high-energy needs. Consequently, RPE mitochondrial dysfunction can lead to tissue damage and has been implicated in the development of AMD. In RPE cells from eyes with AMD, damaged, fragmented, and ruptured mitochondria have been observed. mtDNA mutation levels are also elevated in RPE cells of eyes with AMD.

Mitochondrial respiration plays an important role in cell survival. We evaluated the role of RSG in the regulation of mitochondrial function Mitochondria are major sources of ROS generation that contribute to oxidative stress-mediated cell death. To examine whether RSG reduces oxidative stress-mediated ROS production, we measured ROS levels. As shown, ROS production was significantly increased in HQ-treated cells when compared to control, while RSG co-treatment significantly decreased HQ-induced ROS production. RSG alone did not significantly change ROS level when compared to control.

Primary mitochondrial disorders may sometimes cause skin manifestations (e.g., rashes, pigmentation abnormalities, acrocyanosis) and primary skin disorders may sometimes be linked to mitochondrial dysfunction. A number of skin disorders (e.g., pruritis, atopic dermatitis, psoriasis) may benefit from treatment, as described herein, to improve mitochondrial function. Mitochondrial dysfunction has been characterized as the rule rather than the exception in skin diseases. Feichtinger, R. G., et al.; Mitochondrial dysfunction: a neglected component of skin diseases; Experimental Dermatology Vol. 23, Issue 9, September 2014 (607-614).

Based on the data set forth above, in addition to anti-neovascularization effects described in incorporated U.S. patent application Ser. No. 16/882,656 entitled PEPTIDE COMPOSITIONS AND RELATED METHODS and Ser. No. 16/882,660 entitled PEPTIDE COMPOSITIONS AND RELATED METHODS, the peptide treatments described herein may be used to treat a variety of disorders, including but not necessarily limited to the following:

Ocular: diabetic retinopathy, retinal neovascularization, exudative or wet macular degeneration, nonexudative or dry macular degeneration, retinitis pigmentosa, glaucoma, other retinal degenerations, dry eye disease, retinal inflammation, scleral inflammation, episcleral inflammation or corneal inflammation.

Neurological: Multiple Sclerosis, Alzheimer's disease (AD), Parkinson's disease (PD), Huntington's disease (HD), Amyotrophic lateral sclerosis (ALS), Peripheral neuropathy, Peripheral nerve pain, stroke, tinnitus and other disorders which cause degeneration of function and/or structure in central and/or peripheral neurons;

Pulmonary: Chronic Obstructive Pulmonary Disease, Pulmonary Fibrosis;

Cardiovascular/Renal: Congestive Heart Failure, Chronic heart failure with reduced ejection fraction, Chronic heart failure with preserved ejection fraction, Barth syndrome, Kidney Failure, Kidney Disease, Kidney failure due to percutaneous renal angiography for renal artery stenosis, Vascular inflammations, Vasculitis, Hemorrhoids;

Hepatologic: Non-Alcoholic Steato Hepatitis (NASH)

Muscular: Impaired skeletal muscle function in the elderly, primary muscle mitochondrial myopathy or neuropathy, ischemia-reperfusion injury, Cardiac or skeletal muscle impairment resulting from protozoal or other microbial infections;

Dermatological/Topical: Rash, Pigmentation abnormality, Acrocyanosis, Atopic Dermatitis, Malasma, Pruritis, Psoriasis and Hemorrhoids;

Otic: inflammations of the middle or inner ear, Meniere's disease, sensorineural hearing loss or tinnitus The dosage, dosing schedule and/or route of administration may differ depending on the type and severity of disease or disorder being treated. For example, in at least some applications where a compound comprising ALG-3001 through ALG-3009 is administered intravitreally or topically to a subject's eye the dosage of the compound selected from ALG-3001 to ALG-3009 may be in the following range(s) or others as may be clinically appropriate:

a) Intravitreal injection or implantation: 0.01 mg/50 uL-10.0 mg/50 uL, or 1.0 mg/50 uL-2.0 mg/50 uL b) Topical application to the eye: –0.01 g/100 mL-40 g/100 mL, or 0.60 g/100 mL c) Intravenous injection or infusion: 0.01 mg/kg body weight-50 mg/kg body weight, or 5.0 mg/kg body weight-6.0 mg/kg body weight d) Topical applications to skin or mucous membranes: 0.01 g/100 g-40 g/100 g, or 0.40 g/100 g-0.50 g/100 g e) Intradermal, subcutaneous, intramuscular, intraperitoneal or other injection or implantation: 0.01 mg/kg body weight-50 mg/kg body weight, or 5.0 mg/kg body weight-6.0 mg/kg body weight f) Intreathecal, epidural: 0.01 mg/kg body weight-50 mg/kg body weight, or 2.0 mg/kg body weight-6.0 mg/kg body weight g) Ear (e.g., otic, transtympanic, intratympanic, intracochlear) application for inflammations of the middle or inner ear, Meniere's disease, sensorineural hearing loss or tinnitus: 0.01 g/100 g-40 g/100 g, or 0.40 g/100 g-0.50 g/100 g h) Rectal or transmucosal application (e.g., suppository or topical application for treatment of vascular inflammation, vasculitis, Hemorrhoids or for systemic transmucosal absorption): 0.01 g/100 g-40 g/100 g, or 0.40 g/100 g-0.50 g/100 g Although the above description refers to examples or embodiments, various additions, deletions, alterations and modifications may be made to those described examples and embodiments without departing from the intended spirit and scope of the invention(s) disclosed herein. For example, any elements, steps, members, components, compositions, reactants, parts or portions of one embodiment or example may be removed/eliminated and/or incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims.

```
                              SEQUENCE LISTING

Sequence total quantity: 13
SEQ ID NO: 1           moltype = AA  length = 6
FEATURE                Location/Qualifiers
source                 1..6
                       mol_type = protein
                       organism = synthetic construct
SEQUENCE: 1
GKGDTP                                                                    6

SEQ ID NO: 2           moltype = AA  length = 6
FEATURE                Location/Qualifiers
source                 1..6
                       mol_type = protein
                       organism = synthetic construct
SITE                   4
                       note = Cysteic acid
SEQUENCE: 2
GRGXTP                                                                    6

SEQ ID NO: 3           moltype = AA  length = 9
FEATURE                Location/Qualifiers
source                 1..9
                       mol_type = protein
                       organism = synthetic construct
SITE                   4
                       note = Cysteic acid
SEQUENCE: 3
GRGXGGGDG                                                                 9

SEQ ID NO: 4           moltype = AA  length = 9
FEATURE                Location/Qualifiers
source                 1..9
                       mol_type = protein
                       organism = synthetic construct
VARIANT                1
                       note = May be replaced with Arg, Asp, His, Lys, Trp, Phe,
                        Tyr, Met, Ala, Leu, or Guanidino group
SITE                   4
                       note = Cysteic acid
SEQUENCE: 4
GRGXGGGDG                                                                 9

SEQ ID NO: 5           moltype = AA  length = 6
FEATURE                Location/Qualifiers
source                 1..6
                       mol_type = protein
                       organism = synthetic construct
SITE                   4
                       note = Cysteic acid
SEQUENCE: 5
GRAXTP                                                                    6

SEQ ID NO: 6           moltype = AA  length = 6
FEATURE                Location/Qualifiers
source                 1..6
                       mol_type = protein
                       organism = synthetic construct
SEQUENCE: 6
GRGCTP                                                                    6

SEQ ID NO: 7           moltype = AA  length = 6
FEATURE                Location/Qualifiers
source                 1..6
                       mol_type = protein
                       organism = synthetic construct
SEQUENCE: 7
GRDGTP                                                                    6
```

```
SEQ ID NO: 8          moltype = AA   length = 6
FEATURE               Location/Qualifiers
source                1..6
                      mol_type = protein
                      organism = synthetic construct
SEQUENCE: 8
GRAETP                                                                    6

SEQ ID NO: 9          moltype = AA   length = 6
FEATURE               Location/Qualifiers
source                1..6
                      mol_type = protein
                      organism = synthetic construct
SEQUENCE: 9
GRGNTP                                                                    6

SEQ ID NO: 10         moltype = AA   length = 6
FEATURE               Location/Qualifiers
source                1..6
                      mol_type = protein
                      organism = synthetic construct
SEQUENCE: 10
GDGRTP                                                                    6

SEQ ID NO: 11         moltype = AA   length = 6
FEATURE               Location/Qualifiers
source                1..6
                      mol_type = protein
                      organism = synthetic construct
SITE                  2
                      note = Cysteic acid
SEQUENCE: 11
GXGRTP                                                                    6

SEQ ID NO: 12         moltype = AA   length = 6
FEATURE               Location/Qualifiers
source                1..6
                      mol_type = protein
                      organism = synthetic construct
SEQUENCE: 12
GRGETP                                                                    6

SEQ ID NO: 13         moltype = AA   length = 6
FEATURE               Location/Qualifiers
source                1..6
                      mol_type = protein
                      organism = synthetic construct
SEQUENCE: 13
GRGEYP                                                                    6
```

What is claimed is:

1. An isolated, synthetic hexapeptide compound consisting of Gly-Arg-Gly-Cys-Thr-Pro (SEQ ID NO:6).

2. A salt of a compound according to claim 1.

3. A compound according to claim 2, wherein the salt is selected from hydrochloride, acetate, and hydrofluoroacetate.

4. A pharmaceutical preparation comprising a compound according to claim 1 in combination with at least one pharmaceutically acceptable carrier, diluent, solvent or excipient.

5. A pharmaceutical preparation comprising a compound according to claim 1 for topical applications to skin or mucous membranes.

* * * * *